US012152407B2

(12) United States Patent
Farag

(10) Patent No.: US 12,152,407 B2
(45) Date of Patent: Nov. 26, 2024

(54) REKEYABLE LOCK WITH SMALL INCREMENTS

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/076,747

(22) Filed: Dec. 7, 2022

(65) Prior Publication Data

US 2023/0102123 A1 Mar. 30, 2023

Related U.S. Application Data

(63) Continuation of application No. 16/527,188, filed on Jul. 31, 2019, now Pat. No. 11,572,708.

(60) Provisional application No. 62/712,369, filed on Jul. 31, 2018.

(51) Int. Cl.
*E05B 27/00* (2006.01)

(52) U.S. Cl.
CPC ........ *E05B 27/005* (2013.01); *E05B 27/0082* (2013.01)

(58) Field of Classification Search
CPC .... E05B 27/00; E05B 27/005; E05B 27/0082; E05B 27/0003; E05B 27/0017; E05B 27/0078; E05B 27/02
USPC ........................................................... 70/384
See application file for complete search history.

(56) References Cited

U.S. PATENT DOCUMENTS

| | | | | |
|---|---|---|---|---|
| 4,712,399 A * | 12/1987 | Mattossovich | E05B 27/005 | 70/495 |
| 5,791,181 A * | 8/1998 | Sperber | E05B 27/005 | 70/491 |
| 5,819,566 A * | 10/1998 | Eden, Jr. | E05B 27/0078 | 70/358 |
| 6,860,131 B2 * | 3/2005 | Armstrong | E05B 29/004 | 70/495 |
| 6,862,909 B2 | 3/2005 | Armstrong et al. | | |
| 6,871,520 B2 | 3/2005 | Armstrong et al. | | |
| 6,951,123 B2 | 10/2005 | Chong | | |
| 6,959,569 B2 | 11/2005 | Strader et al. | | |
| 6,973,813 B2 * | 12/2005 | Erdely | E05B 29/004 | 70/377 |

(Continued)

FOREIGN PATENT DOCUMENTS

| | | |
|---|---|---|
| CN | 103114765 A | 5/2013 |
| CN | 105196530 A | 12/2015 |

(Continued)

OTHER PUBLICATIONS

Chinese language and English language translation of CN Office Action, including search report, dated Oct. 26, 2021, for CN patent application No. 201980057198.8 (15 pages).

(Continued)

*Primary Examiner* — Nathan Cumar
(74) *Attorney, Agent, or Firm* — Merchant & Gould P.C.

(57) ABSTRACT

A rekeyable lock cylinder with a cylinder body and a plug assembly. The lock cylinder includes a plurality of key followers and a corresponding plurality of racks disposed in the plug assembly. Disengaging the racks from the key followers allows rekeying of the lock cylinder.

20 Claims, 23 Drawing Sheets

(56) References Cited

U.S. PATENT DOCUMENTS

| | | | | |
|---|---|---|---|---|
| 7,007,528 | B2 * | 3/2006 | Chong | E05B 29/0073 70/495 |
| 7,114,357 | B2 | 10/2006 | Armstrong et al. | |
| 7,117,701 | B2 | 10/2006 | Armstrong et al. | |
| 7,213,429 | B2 | 5/2007 | Armstrong et al. | |
| 7,234,331 | B2 | 6/2007 | Armstrong et al. | |
| 7,308,811 | B2 | 12/2007 | Armstrong et al. | |
| 7,322,219 | B2 | 1/2008 | Armstrong et al. | |
| 7,434,431 | B2 | 10/2008 | Armstrong et al. | |
| 7,448,239 | B1 | 11/2008 | Huang et al. | |
| 7,448,240 | B1 | 11/2008 | Huang et al. | |
| 7,565,825 | B2 | 7/2009 | Wheatland et al. | |
| 7,634,931 | B2 | 12/2009 | Segien et al. | |
| 7,836,739 | B2 | 11/2010 | Huang et al. | |
| 7,878,036 | B2 | 2/2011 | Armstrong et al. | |
| 7,900,491 | B2 | 3/2011 | Chong | |
| 8,033,150 | B2 | 10/2011 | Armstrong et al. | |
| 8,099,988 | B1 | 1/2012 | Wheatland | |
| 8,291,735 | B1 | 10/2012 | Damikolas | |
| 8,347,678 | B2 | 1/2013 | Chong | |
| 8,408,080 | B2 | 4/2013 | Damikolas | |
| 8,448,484 | B2 | 5/2013 | Huang et al. | |
| 8,490,446 | B2 | 7/2013 | Rao et al. | |
| 8,656,747 | B2 | 2/2014 | Armstrong et al. | |
| 8,739,587 | B2 | 6/2014 | Chen | |
| 8,881,567 | B2 | 11/2014 | Chong et al. | |
| RE45,627 | E | 7/2015 | Chong et al. | |
| 9,127,479 | B2 | 9/2015 | Romero et al. | |
| 9,359,791 | B2 | 6/2016 | Zhang | |
| 9,435,138 | B2 | 9/2016 | Walls et al. | |
| 9,657,499 | B2 | 5/2017 | Emory | |
| 9,988,828 | B2 | 6/2018 | Emory | |
| 10,024,079 | B2 | 7/2018 | Walls et al. | |
| 10,435,915 | B2 | 10/2019 | Zhang | |
| 10,612,271 | B2 | 4/2020 | Farag et al. | |
| 11,220,840 | B1 | 1/2022 | Farag | |
| 11,572,708 | B2 | 2/2023 | Farag | |
| 2005/0016234 | A1 | 1/2005 | Strader et al. | |
| 2006/0101880 | A1 | 5/2006 | Ward-Dolkas et al. | |
| 2008/0314106 | A1 | 12/2008 | Mathachan | |
| 2009/0277234 | A1 | 11/2009 | Huang et al. | |
| 2009/0277239 | A1 | 11/2009 | Mathachan | |
| 2010/0037666 | A1 | 2/2010 | Chong | |
| 2011/0041577 | A1 | 2/2011 | Zhang | |
| 2011/0041579 | A1 * | 2/2011 | Chen | E05B 27/0082 70/495 |
| 2012/0247163 | A1 * | 10/2012 | Damikolas | E05B 27/001 70/492 |
| 2012/0304717 | A1 | 12/2012 | Loreti | |
| 2013/0014548 | A1 * | 1/2013 | Fan | E05B 27/005 70/372 |
| 2013/0086957 | A1 * | 4/2013 | Emory | E05B 29/0066 70/492 |
| 2013/0086958 | A1 * | 4/2013 | Emory | E05B 29/0046 70/357 |
| 2014/0041429 | A1 * | 2/2014 | Zhang | E05B 27/005 70/490 |
| 2014/0069156 | A1 * | 3/2014 | Romero | E05B 27/005 70/385 |
| 2014/0223976 | A1 * | 8/2014 | Chiou | E05B 27/005 70/490 |
| 2014/0250960 | A1 * | 9/2014 | Li | E05B 27/005 70/493 |
| 2016/0369527 | A1 | 12/2016 | Farag et al. | |
| 2020/0040605 | A1 | 2/2020 | Farag | |
| 2020/0123806 | A1 | 4/2020 | Rufang | |
| 2022/0213716 | A1 | 7/2022 | Farag | |

FOREIGN PATENT DOCUMENTS

| | | | |
|---|---|---|---|
| JP | 2011074613 | A | 4/2011 |
| WO | 2022/204154 | A1 | 9/2022 |

OTHER PUBLICATIONS

International Search Report and Written Opinion for Application No. PCT/US2019/044352 mailed Oct. 9, 2019.

International Search Report and Written Opinion for Application No. PCT/US2022/021338 mailed Jun. 23, 2022.

* cited by examiner

REKEYABLE LOCK WITH SMALL INCREMENTS

CROSS-REFERENCE TO RELATED APPLICATIONS

The present application is a continuation of U.S. patent application Ser. No. 16/527,188, now U.S. Pat. No. 11,572,708, filed on Jul. 31, 2019, which claims priority from U.S. Provisional Patent Application No. 62/712,369, filed on Jul. 31, 2018, the disclosures of which are hereby incorporated by reference in their entirety.

BACKGROUND

Lock cylinders that can be rekeyed without removal of the cylinder plug are known. These types of locks are highly beneficial to consumers because the locks can be easily rekeyed without calling a locksmith. Sizes and tolerances of engaging components within the lock become smaller to allow an increased variation in the bitting of keys. This also creates an increase in stress on the small components. Therefore, there is a need for a rekeyable lock that increases the variation in the bitting of keys recognized by the lock while maximizing strength of the small components.

SUMMARY

This disclosure relates generally to locks; in particular, this disclosure relates to a lock with a rekeyable lock cylinder. According to one aspect of the present disclosure, a rekeyable lock cylinder is provided that maximizes a number of bitting positions for use in unlocking the lock cylinder. By maximizing a number of bitting positions, for example seven or more bitting positions, the number of bitting combinations of a key used with the lock cylinder is increased. This maximizes security of the lock cylinder.

According to one aspect, this disclosure provides a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly, with the rack being selectively disengageable from the key follower to facilitate rekeying between different keys. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is formed to define a rack engagement feature, such as a post, and the rack is formed to include a key follower engagement feature, such as a slot extending at least partially through and bounded by the rack. The post is received in the slot such that complementary engagement surfaces of the post and slot engage with one another to block movement of the key follower relative to the rack.

According to yet another aspect, this disclosure provides a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is engaged with the rack by an engagement feature. The rack is selectively disengageable from the key follower to facilitate rekeying between different keys. The engagement feature allows at least seven different positions of the key follower relative to the rack to allow at least seven different bitting positions in the rekeyable lock cylinder.

According to yet another aspect, this disclosure provides a rekeyable lock cylinder. The rekeyable lock cylinder includes a cylinder body with a longitudinal axis and formed to define a groove. The rekeyable lock cylinder includes a plug assembly disposed in the cylinder body and rotatable about the longitudinal axis. The rekeyable lock cylinder includes a locking bar movable between a locked position and an unlocked position. When in the locked position, the locking bar is positioned within the groove of the cylinder body to block rotation of the plug assembly with respect to the cylinder body. When in the unlocked position, the locking bar is spaced apart from the groove of the cylinder body to allow rotation of the plug assembly with respect to the cylinder body. The rekeyable lock cylinder includes a key follower disposed in the plug assembly and the key follower includes a rack engagement feature. The rekeyable lock cylinder includes a rack disposed in the plug assembly and the rack includes a key follower engagement feature. The rack engagement feature of the key follower and the key follower engagement feature of the rack are engaged to facilitate simultaneous movement of the key follower and the rack. The rack controls movement of the locking bar between the locked and unlocked positions. At least one of the rack engagement feature of the key follower and the key follower engagement feature of the rack is a projection and at least one of the rack engagement feature of key follower and the key follower engagement feature of the rack is a slot. The rack is selectively disengageable from the key follower when moving in a direction parallel to the longitudinal axis of the plug assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
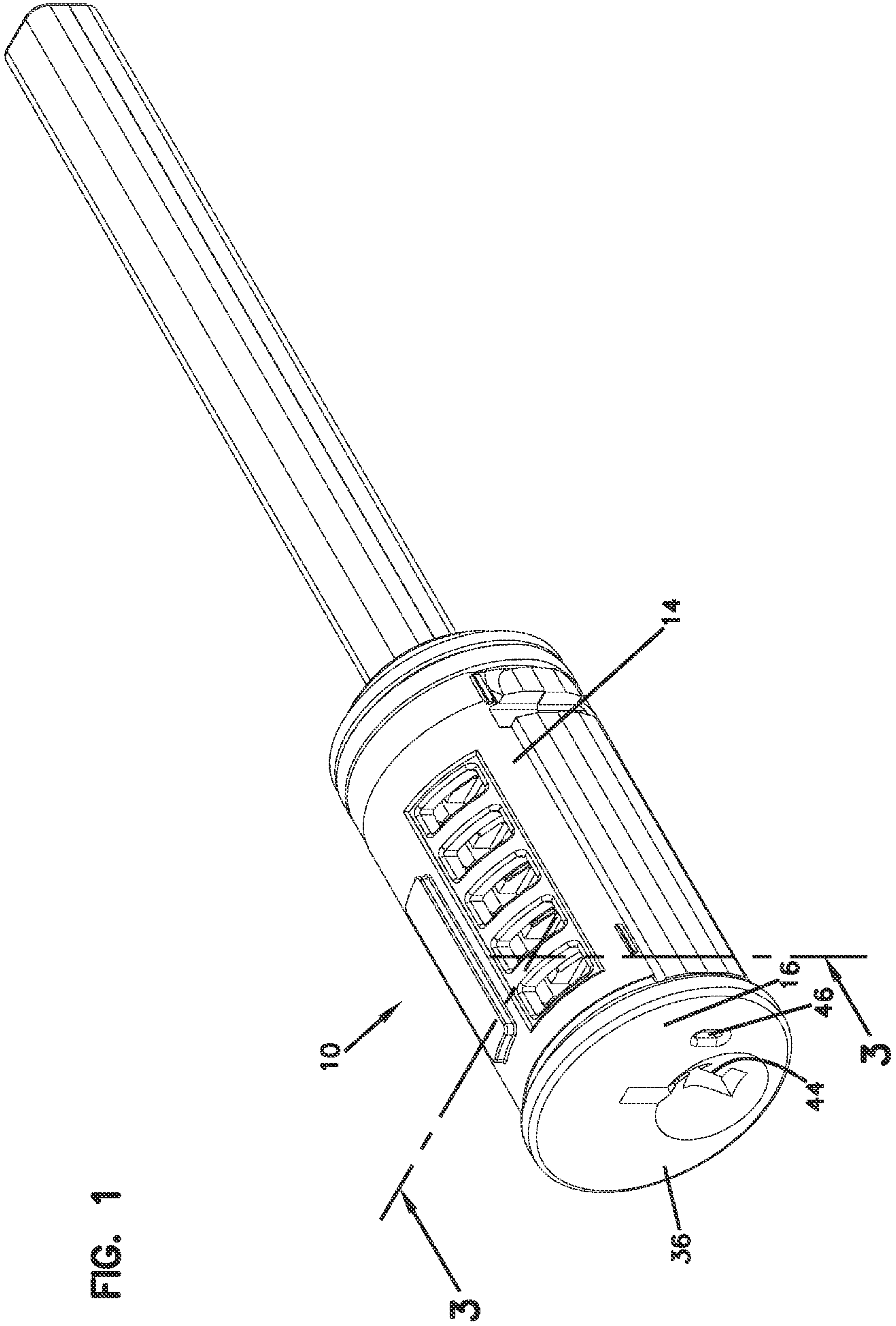
FIG. 1 is a perspective view of an example lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

This disclosure relates to a rekeyable lock cylinder that can be rekeyed without removal of the cylinder plug. The operation for rekeying the lock cylinder is similar to that described in co-pending U.S. Pat. Pub. No. 2016/0369527, which is hereby incorporated by reference. While the rekeying operation operates similarly, the present lock cylinder includes pin-rack engagement features that maximize a number of bitting positions in the lock while maintaining strength.

Figure 2:
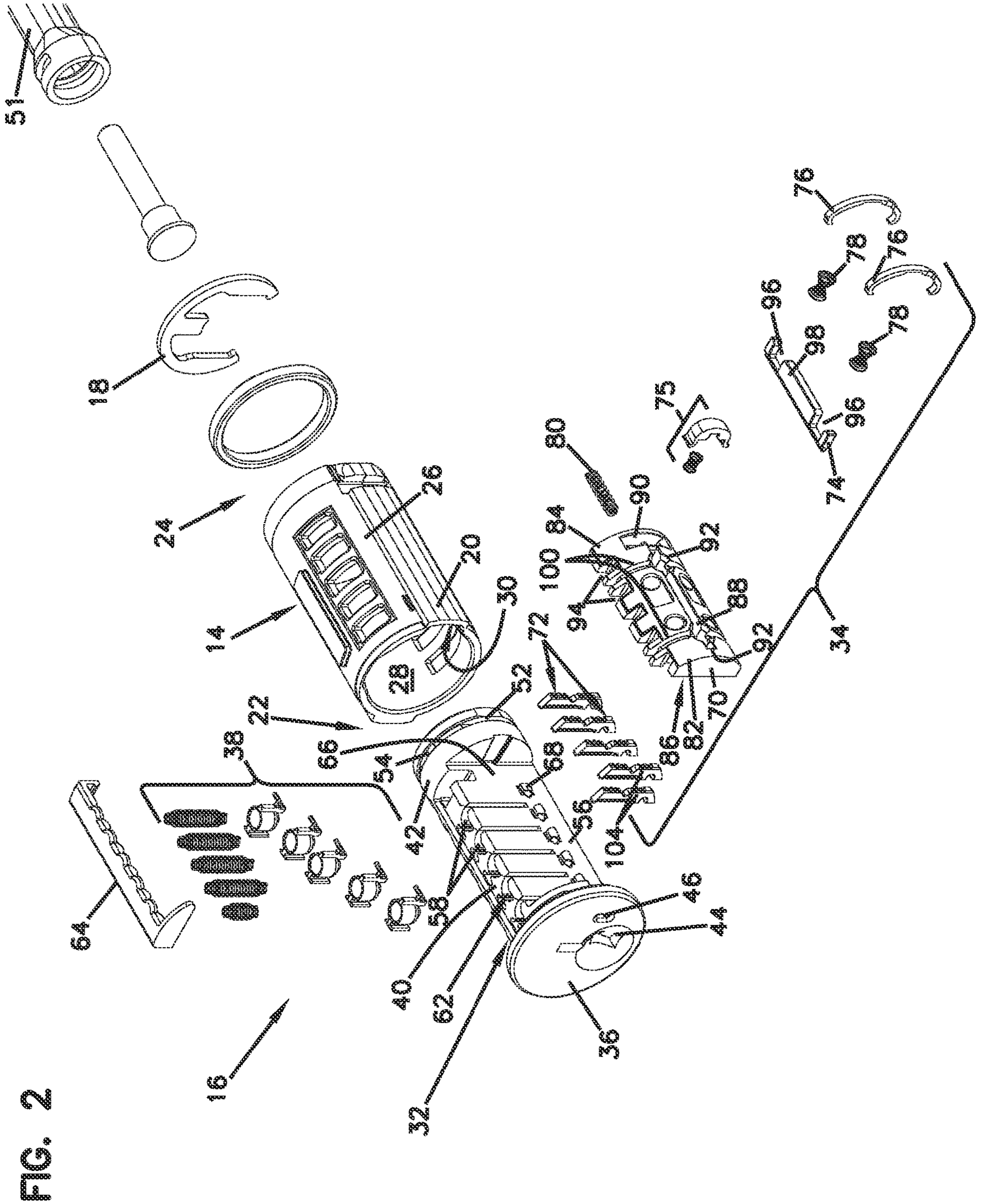
FIG. 2 is an exploded view of the example lock cylinder shown in FIG. 1.

An illustrative lock cylinder 10, according to an embodiment of the present disclosure, is illustrated in FIGS. 1 and 2. The lock cylinder 10 includes a cylinder body 14 and a plug assembly 16. A retainer clip 18 (FIG. 2) couples together the cylinder body 14 with the plug assembly 16.

The cylinder body 14, as best seen in FIG. 2, illustratively includes a generally cylindrical body 20 having a front end 22, a back end 24, and a cylinder wall 26 defining an interior surface 28. The cylinder wall 26 includes an interior, locking bar engaging groove 30 (best seen in FIGS. 3, 13, and 14). In some examples, the locking bar engaging groove 30 has a generally rectangular-shaped cross-section and extends longitudinally along a portion of the cylinder body 14, typically from the front end 22.

The plug assembly 16 includes a plug body 32, a carrier subassembly 34, and a plurality of key followers 38 (also known as pins). The plug body 32 illustratively includes a plug face 36, an intermediate portion 40, and a drive portion 42. The plug face 36 defines a keyway opening 44 and a rekeying tool opening 46. In some examples, the plug face 36 further defines a pair of channels extending radially outwardly for receiving anti-drilling ball bearings. The drive portion 42 is configured to drive a torque blade 51, which could be coupled with a latch assembly (not shown). The drive portion 42 further includes a pair of slots 52 formed in its perimeter and a central groove 54 for receiving the retainer clip 18 to retain the plug body 32 in the cylinder body 14.

The intermediate portion 40 includes a main portion 56 formed as a cylinder section and having a plurality of channels 58 for receiving the key followers 38. The channels 58 illustratively extend transversely to the longitudinal axis of the plug body 32. A retaining cap 64 is received in a recess 62 to trap the key followers 38 inside the plug body 32. The channels 58 extend partially through the plug body 32, with the sidewalls of the channels open to a planar surface 66. The planar surface 66 illustratively includes a plurality of bullet-shaped, rack-engaging features 68 that block rekeying of the lock cylinder 10 if racks 72 are not aligned to unlock the lock cylinder 10 (e.g., if a valid key is not inserted into the lock cylinder 10).

The carrier subassembly 34 includes a carrier 70, a plurality of racks 72, a spring catch 75, a locking bar 74, a pair of clips 76 for holding corresponding biasing members 78 against the locking bar 74 to urge the locking bar 74 against the racks 72, and a return spring 80. The carrier 70 includes a body 82 in the form of a cylinder section that is complementary to the main portion 56 of the plug body 32, such that the carrier 70 and the main portion 56 combine to form a cylinder that fits inside the cylinder body 14. The carrier 70 includes a curved surface 84 and a flat surface 86. The curved surface 84 includes a locking bar slot 88, a spring catch recess 90, and a pair of clip receiving recesses 100 for receiving the clips 76. The locking bar slot 88 illustratively includes a pair of biasing member-receiving bores 92 for receiving the biasing members 78. In the embodiment shown, the locking bar 74 includes a corresponding pair of recessed areas 96 for receiving the biasing members 78. The flat surface 86 of the carrier 70 includes a plurality of parallel rack-receiving slots 94 extending perpendicular to a longitudinal axis of the carrier 70.

Figure 3:
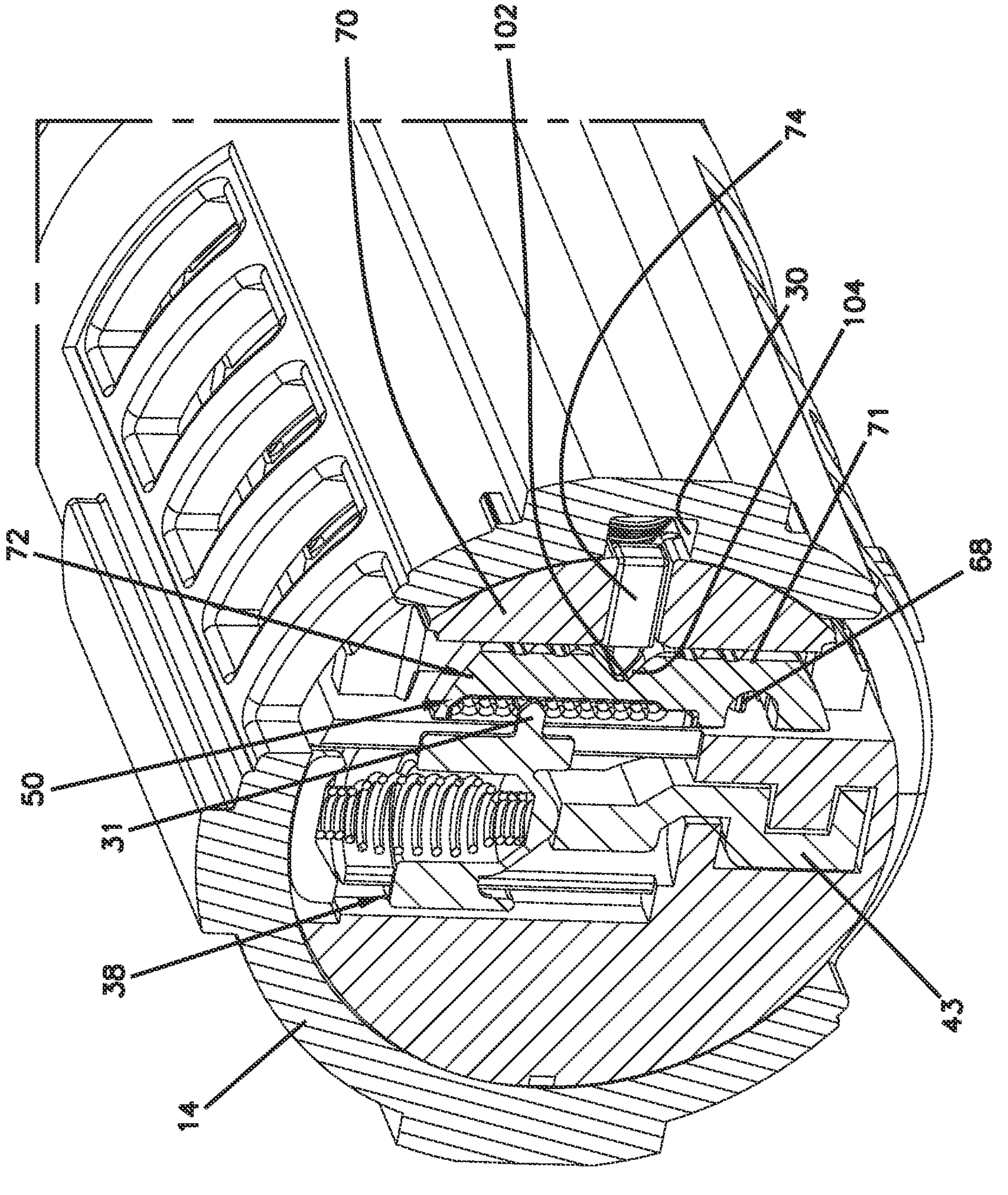
FIG. 3 is a perspective cross-sectional view along line 3-3 of FIG. 1 showing, among other things, the key followers engaged with the racks.
Figure 13:
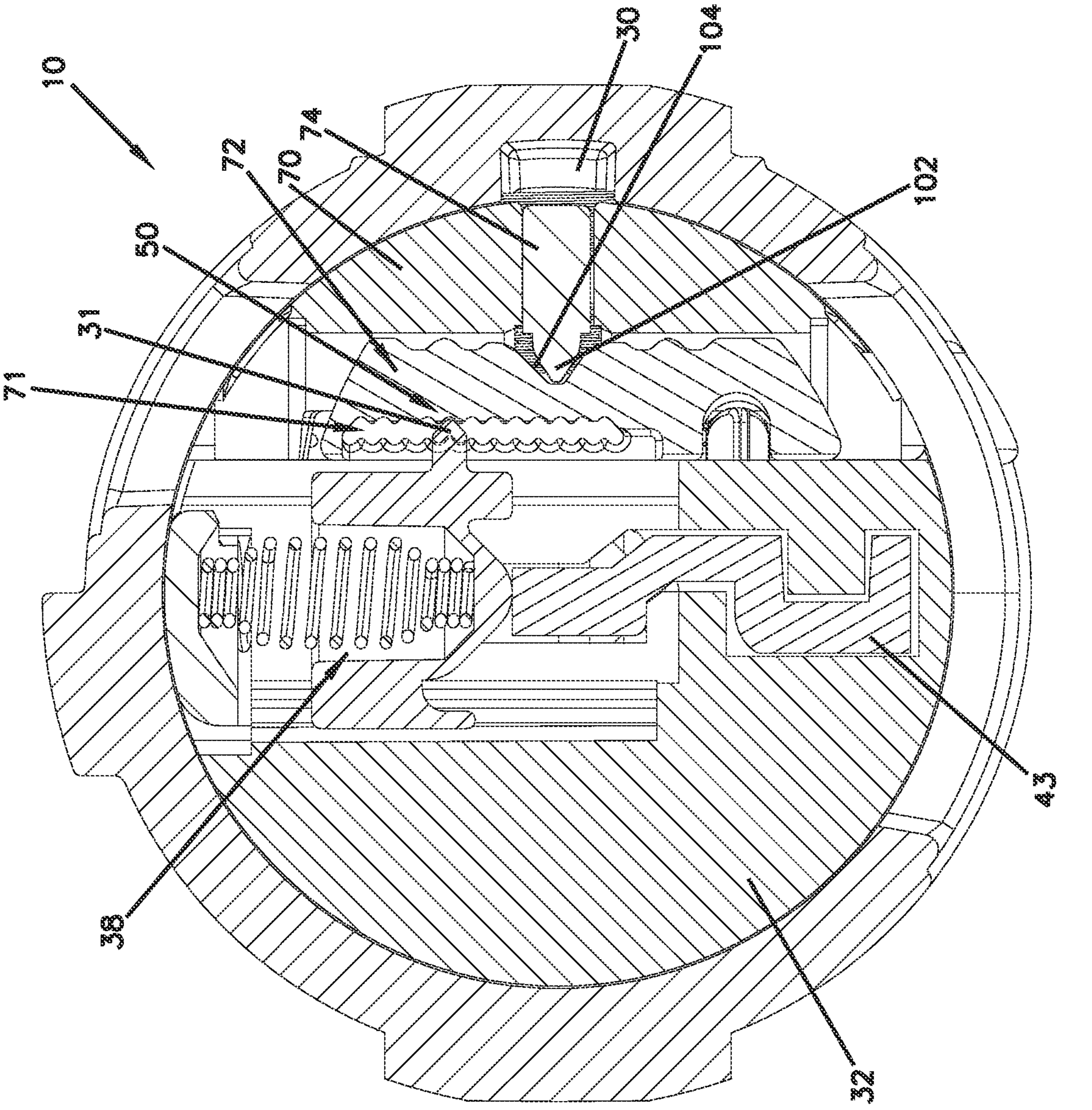
FIG. 13 is a cross-sectional view of the example lock cylinder shown in FIG. 1 showing the locking bar engaged with the rack in a first unlocking position.
Figure 14:
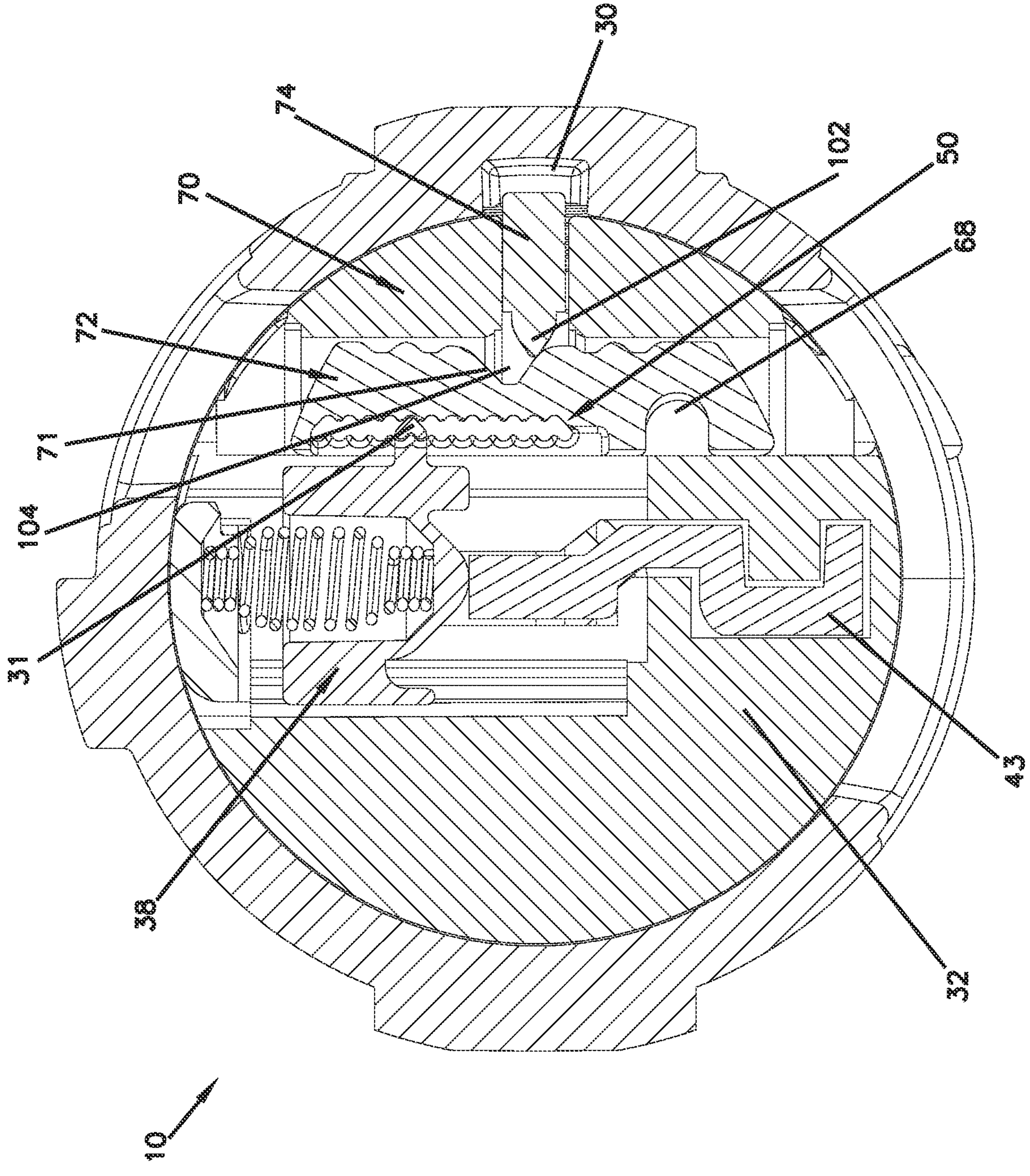
FIG. 14 is a cross-sectional view of the example lock cylinder shown in FIG. 1 showing the locking bar engaged with the rack in a first locked position.

The spring-loaded locking bar 74 is sized and configured to fit in the locking bar slot 88 in the carrier 70. The locking bar 74 illustratively includes a blocking portion 98 that is received in the locking bar engaging groove 30 in the cylinder body 14 when in a locked position (as shown in FIG. 14) and extends out of the locking bar engaging groove 30 when in an unlocked position (FIGS. 3 and 13). Opposite the squared-off edge of the blocking portion 98, the locking bar 74 includes a flange 102 configured to engage locking bar-engaging grooves 104 formed in the racks 72 (FIG. 13). In the depicted examples, the flange 102 is generally triangular shaped and sized so that when the locking bar 74 is in the unlocked position, the flange 102 is positioned entirely within the locking bar-engaging grooves 104 of the racks 72. As such, in some examples, the locking bar-engaging grooves 104 of the racks 72 are larger than the flange 102. Biasing members 78 urge the blocking portion 98 out of the groove 30 in the cylinder body 14 toward the racks 72.

Figure 4:
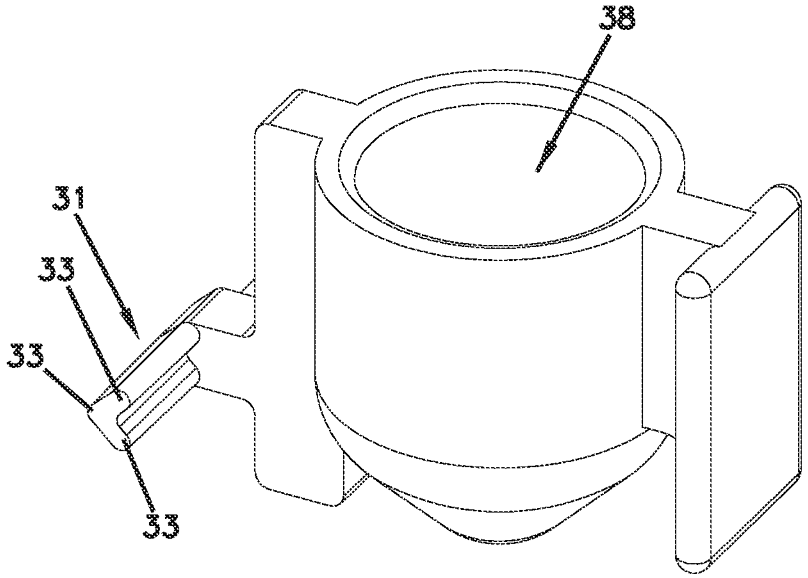
FIG. 4 is a perspective view of an example of a key follower according to an embodiment of this disclosure.
Figure 5:
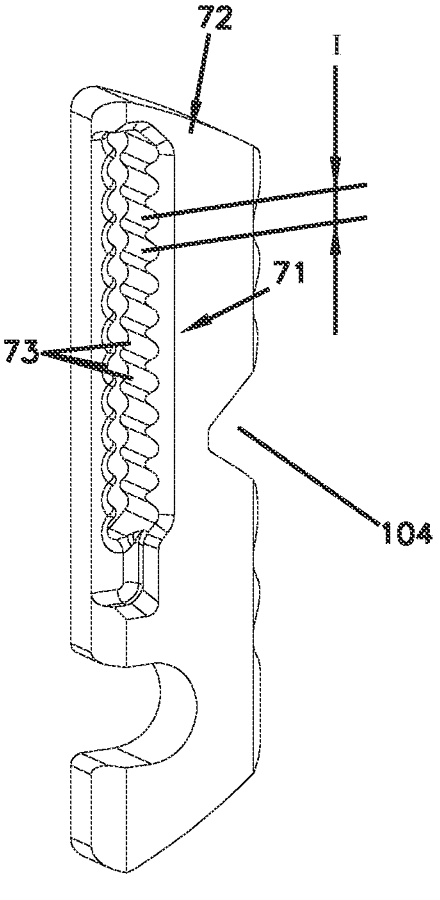
FIG. 5 is a perspective view of an example rack according to an embodiment of this disclosure associated with the example key follower shown in FIG. 4.

A pin-rack engagement feature 50 provides strong engagement between the key followers 38 and the rack 72 while allowing a plurality of bitting positions. One example of a pin-rack engagement feature 50, according to an embodiment of the present disclosure, is shown in FIGS. 3, 4, and 5. The pin-rack engagement feature 50 includes a rack engagement feature of the key follower 38 that is configured to engage with a key follower engagement feature of the rack 72. In the depicted example, the rack engagement feature is a post 31 and the key follower engagement feature is a slot 71. Complementary engagement surfaces of the post 31 and slot 71 engage with one another to block movement of the key followers relative to the racks 72. In some examples, the slot 71 provides engagement support around the post 31, specifically on opposing sides of the post 31.

Reducing size allows the lock to distinguish between additional bitting positions to increase the number of possible bitting sequences or patterns on keys used in lock cylinder 10 compared to the rekeyable lock cylinder described in co-pending U.S. Pat. Pub. No. 2016/0369527, which increases security. The term "bitting position" is intended to mean a depth of a key cut in a bitting sequence of a key. The "bitting position" is typically identified by a digit or letter that indicates a depth of a key cut. The number of bitting positions (i.e., depths of key cuts) that can be recognized by lock cylinders differ. For example, the lock cylinder described in co-pending U.S. Pat. Pub. No. 2016/0369527 is capable of recognizing six different bitting positions. This can be seen by the six gear teeth grooves in the racks illustratively shown in that application that receive the tooth of the key followers, which allows six positions of the key followers relative to the racks. The six positions of the racks relative to the key followers correspond with six bitting positions available for the lock cylinder illustratively described in that application. Due to tolerances in machining and structural rigidity of the racks, it is not feasible to increase the number of gear teeth in the racks to increase the number of bitting positions that are recognized by the lock cylinder described in that application.

The pin-rack engagement feature 50, illustratively described herein, increases the number of bitting positions recognized by the lock cylinder 10. In the depicted example, there are twelve grooves 73 available in the racks 72 that can be engaged by the post 31 of the key followers 38. Each consecutive groove 73 is spaced from one another by an increment distance I (as shown in FIG. 5), which is equal to the incremental distance separating each consecutive bitting position on a key. Accordingly, there are twelve bitting positions recognized by the lock cylinder 10 in the embodiment shown. Of course, one skilled in the art should appreciate that the lock cylinder 10 is shown for illustrative purposes, and could potentially include more or less grooves 73 to adjust the number of bitting positions recognized by the lock cylinder 10. By increasing the possible bitting positions available, such as seven or more for example, this increases the number of possible combinations for the bitting sequences to unlock the lock cylinder 10, thereby increasing security. The pin-rack engagement feature 50 is also robust due to each tooth becoming thinner and less stiff as size is reduced.

In the illustrative embodiment, as shown in FIG. 4, the post 31 includes three offset barrels 33 arranged in a triangular pattern. In some examples, each post 31 includes two offset barrels 33 arranged in a linear pattern. In some examples, each post 31 can have barrels 33 arranged in multiple linear patterns. For example, the linear patterns of the barrels 33 can be offset from one another by a half of a key cut increment to increase engagement with the rack 72. Each barrel 33 defines a semi-cylindrical outer surface. In some examples, cones are arranged at the ends of barrels 33 to guide insertion of the post 31 into the slot 71.

Figure 6:
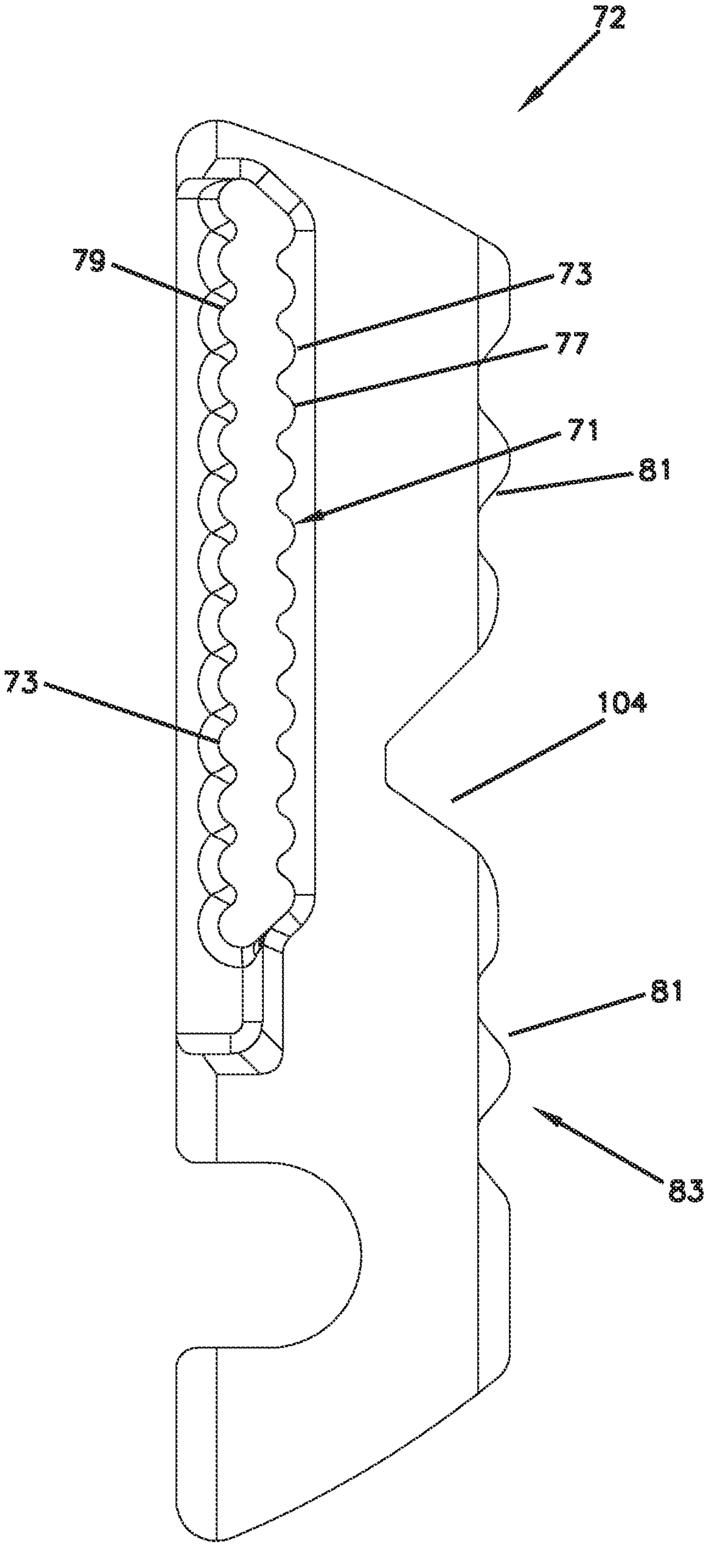
FIG. 6 is a front view of the rack of FIG. 5.
Figure 7:
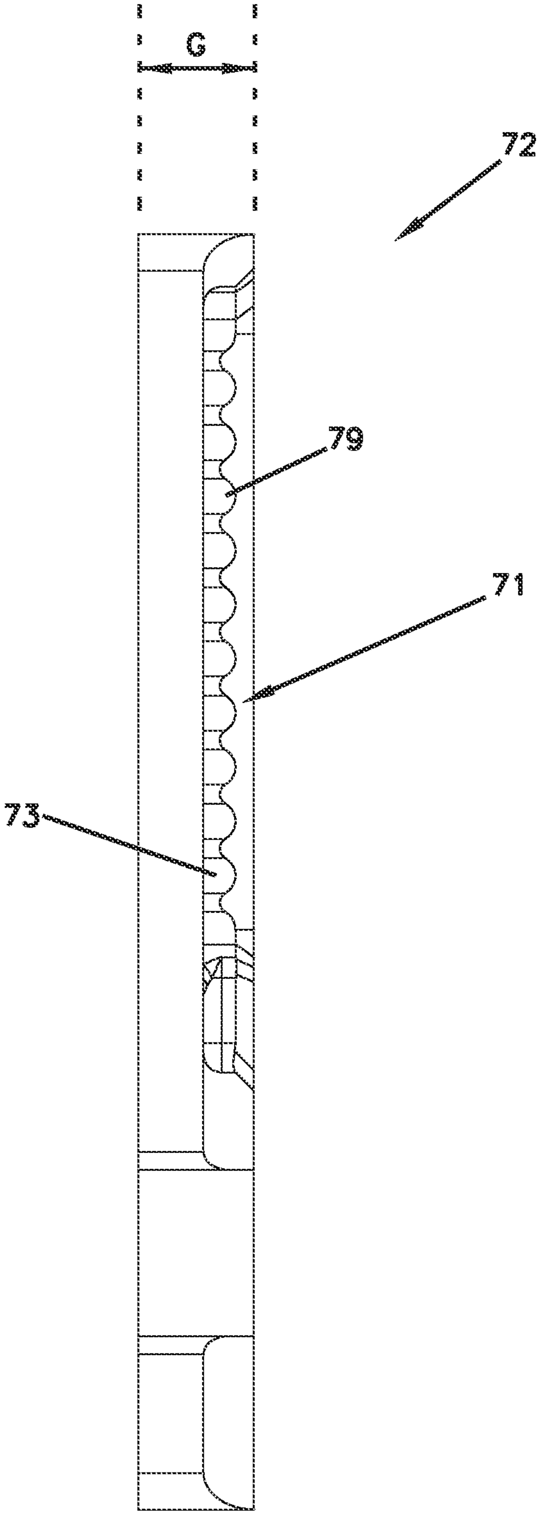
FIG. 7 is a side view of the rack of FIG. 5.
Figure 8:
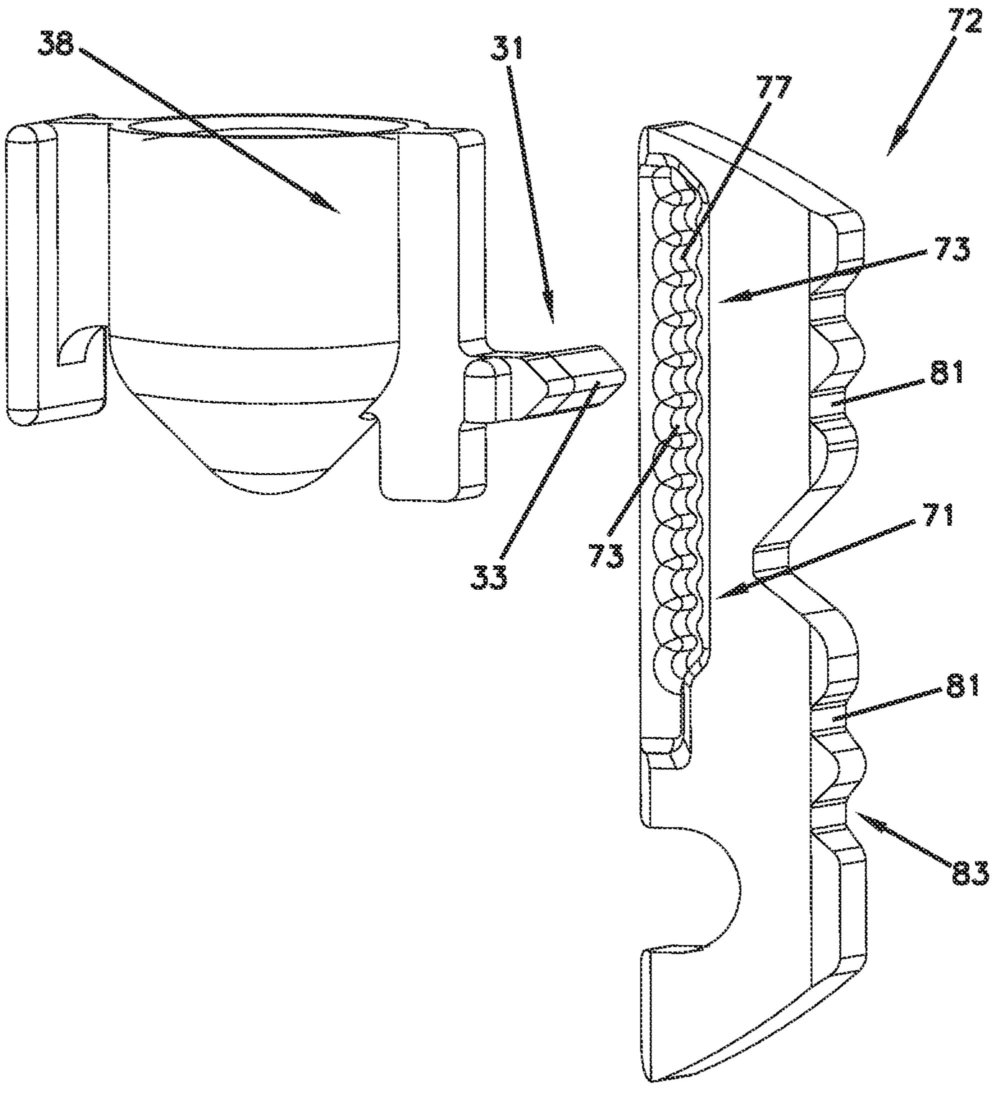
FIGS. 8-11 are perspective views of the key follower of FIG. 4 and rack of FIG. 5 mating.
Figure 9:
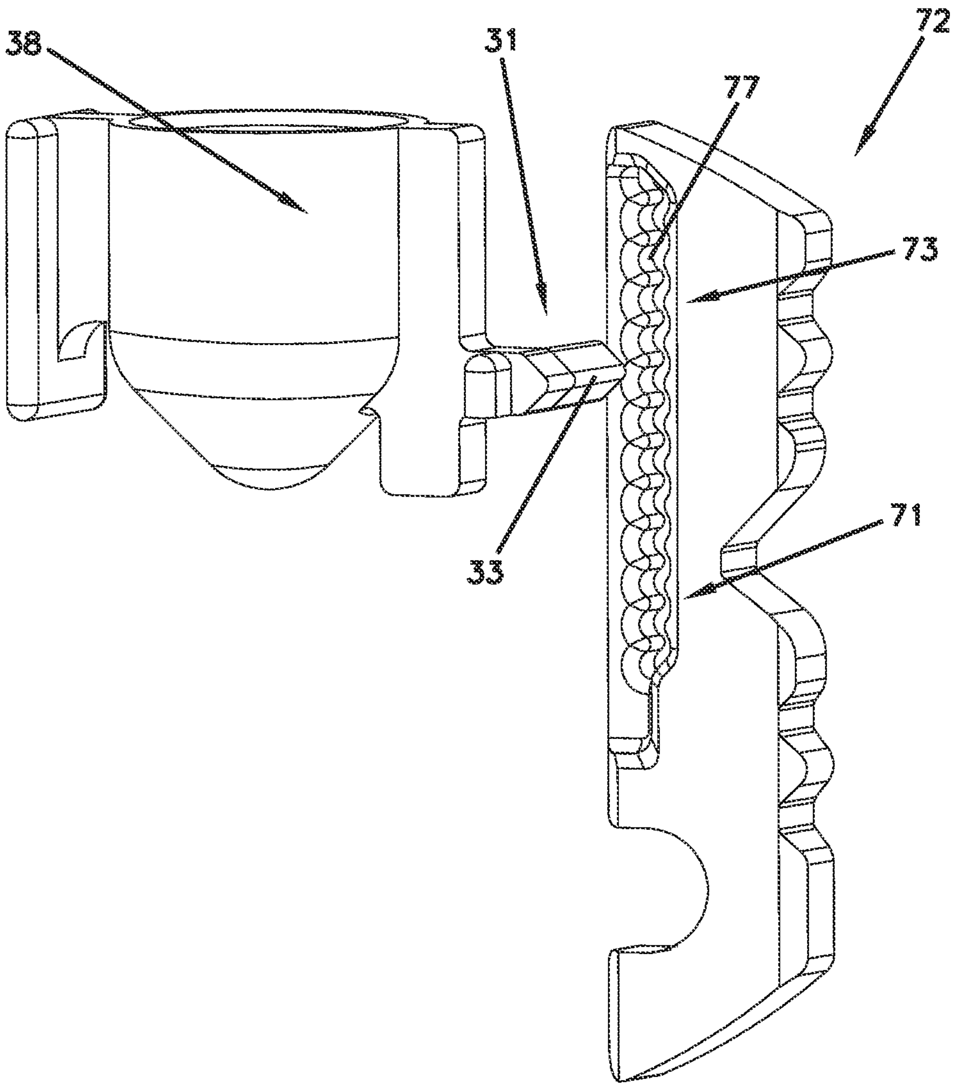
Figure 10:
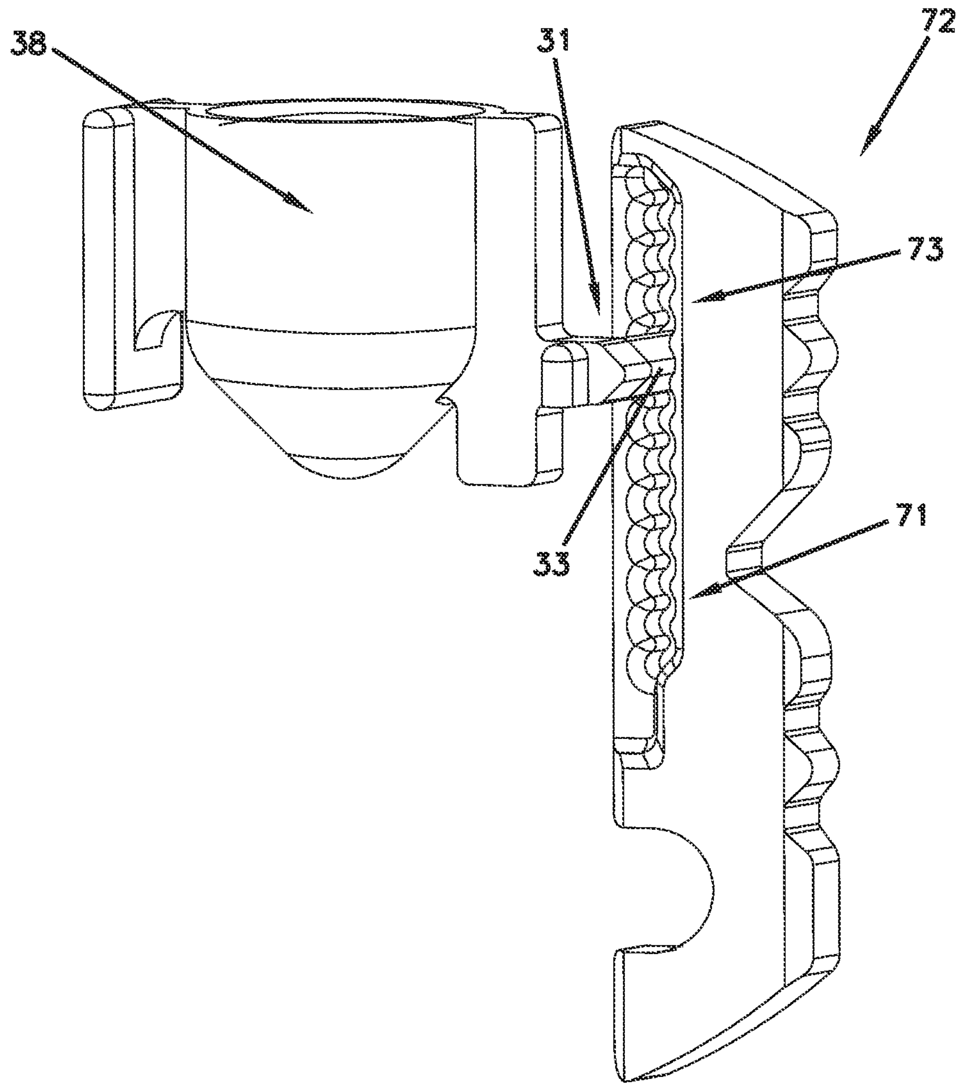
Figure 11:
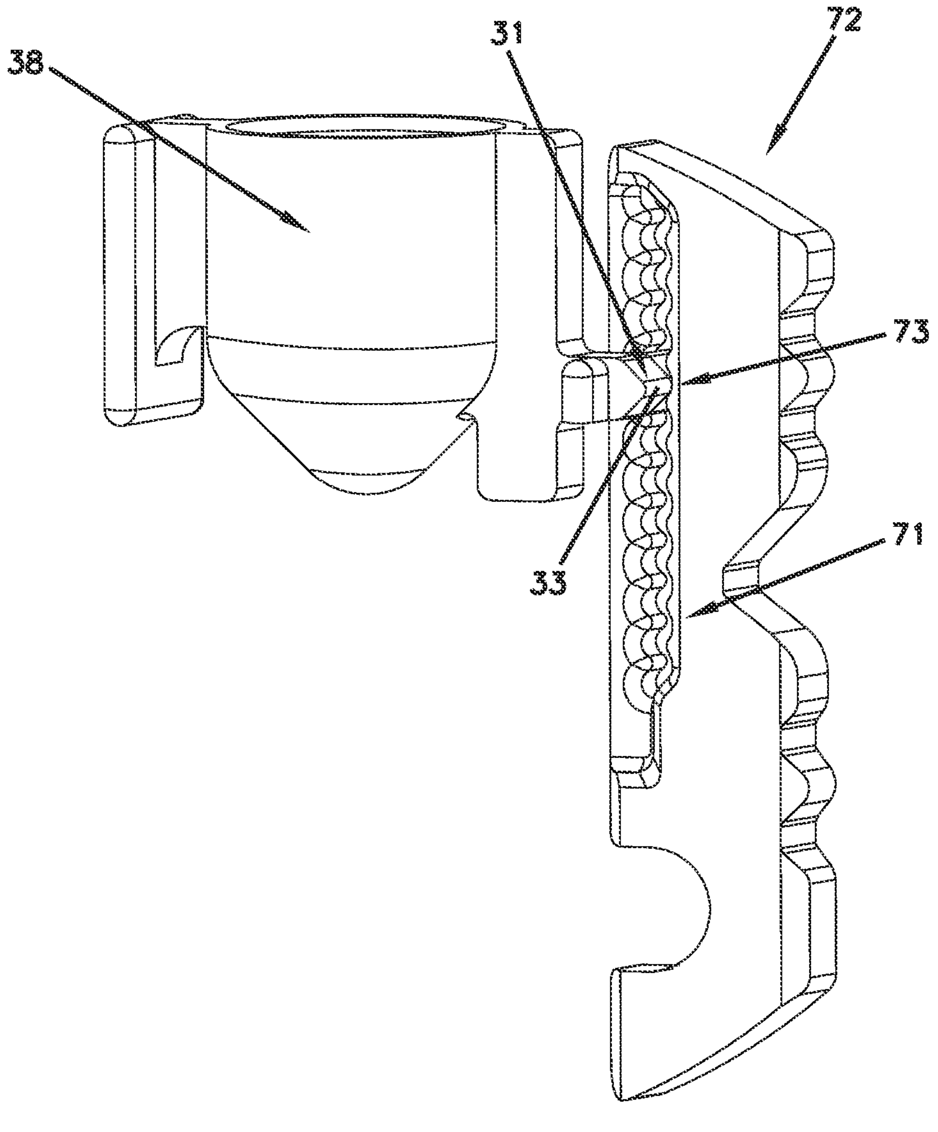

As seen in FIGS. 5-7, the slot 71 includes a series of semi-cylindrical grooves 73. A series of grooves 73 extends along either side of the slot 71 and are offset from one another to correspond to the pattern of barrels 33. The grooves 73 of each rack 72 include a first set of grooves 77, positioned closest to the key followers 38, and a second set of grooves 79 opposite from the first set of grooves 77 in the slot 71. In some examples, as shown in FIG. 7, the second set of grooves 79 can have a length G that is greater than a comparable length of the first set of grooves 77. In the illustrative embodiment, the slot 71 extends through and is bounded on all sides by the rack 72, as shown in FIG. 5. In some examples, the slot 71 does not extend through the entire rack 72.

Figure 12:
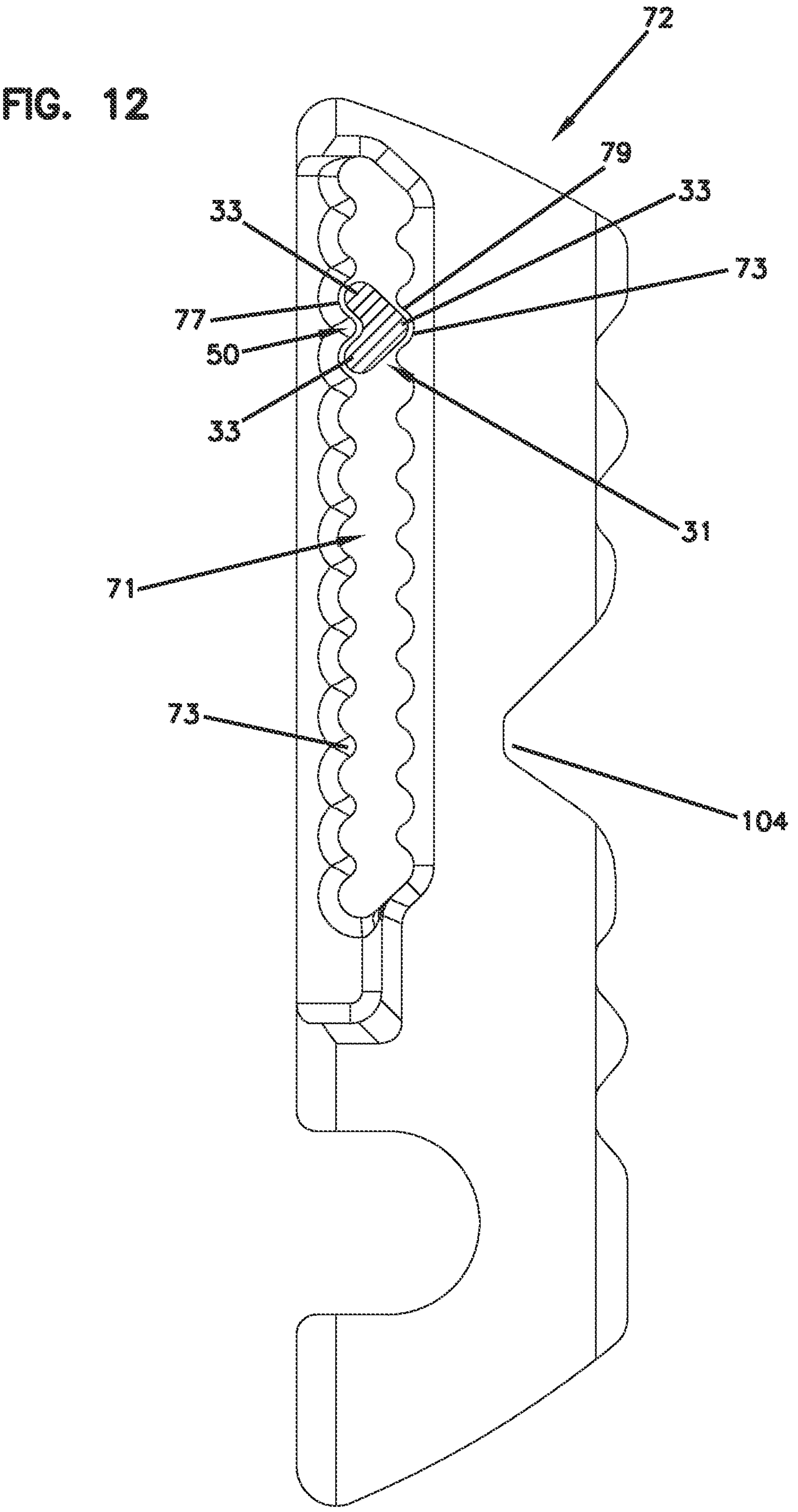
FIG. 12 is a cross-sectional view of a portion of the key follower of FIG. 4 positioned within the rack of FIG. 5.

The semi-cylindrical surfaces of the barrels 33 and semi-cylindrical grooves 73 increase the contact surface area of the pin-rack engagement feature 50. In the depicted example, as shown in FIG. 12, when mated, a single barrel 33 interfaces with a single groove of the second set of grooves 79. Further, in the depicted example, when mated, a pair of barrels 33 interfaces with a pair of grooves of the first set of grooves 77. Specifically, in the depicted example, the post 31 of each key follower 38 interfaces with both sets of grooves 77, 79 of each slot 71 of each rack 72 to further strengthen and stabilize the pin-rack engagement feature 50. In some examples, depending on the thickness of the rack 72 and the lengths of the posts 31, the post 31 does not extend entirely through the slot 71. The post 31 only need to interface, and interlock, with the slot 71 to ensure that the rack 72 and key followers 38 move together. Such an interfacing arrangement maintains strength of the pin-rack engagement feature 50 even as sizes of the components are reduced. It is considered within the scope of the present disclosure, that the key followers 38 can have a variety of different numbers of barrels 33 that interface with a variety of different numbers of either the first or second set of grooves 77, 79.

In some examples, barrels 33 and grooves 73 are formed to define complementary non-circular geometric profiles, such as triangular or rectangular for example. In some examples, the racks 72 can include anti-picking grooves 81 at a side 83 of the rack 72 where the locking bar engaging grooves 104 are defined. Such grooves provide feedback when they are engaged by the locking bar 74, such feedback can mimic that feedback received with the locking bar 74 when positioned within the locking bar engaging grooves 104.

To rekey the lock cylinder 10, a valid key 43 is inserted into the keyway opening 44 and rotated. A tool (not shown) is inserted into the tool opening 46 and pushed against the carrier 70 to move the carrier 70 parallel to the longitudinal axis of the lock cylinder 10 until the spring catch 75 moves into a detent recess of the cylinder body 14. Moving the carrier 70 withdraws the posts 31 of the key followers 38 from the mating slots 71 of the racks 72 in a longitudinal direction, parallel with the longitudinal axis of the lock cylinder 10. The valid key is then removed and a second key (with different bitting from the first key) is inserted and rotated to release the spring catch 75. As the spring catch 75 leaves the detent recess of the cylinder body 14, the carrier 70 is biased toward the plug face 36 by the return spring 80, causing the posts 31 to insert, and interface with, into the slots 71 in a longitudinal direction, parallel with the longitudinal axis of the lock cylinder 10. This longitudinal movement of the posts 31 of the key followers 38 into the slots 71 of the racks 72 is shown in FIGS. 8-11. In some examples, as mentioned above, the key followers 38 and/or racks 72 can include features (e.g., a cone, rounded surfaces, etc.) that help guide the engagement of the posts 31 into the slots 71 and corresponding grooves 73. At this point, the lock cylinder 10 is keyed to the second (valid) key and the first key no longer operates the lock cylinder 10. In some examples, each post 31 can include stiffening rib and each slot 71 of the rack 72 can include a corresponding recess to accommodate stiffening rib.

As the number of bitting positions increases, the incremental position between each bitting position decreases or becomes smaller. A stack up of tolerances from the engagement of multiple components can cause variations in the position of the locking bar-engaging grooves 104 formed in the racks 72 during operation of lock cylinder 10. As shown in FIGS. 13 and 14, the locking bar-engaging grooves 104 of each rack 72 are wider than the flange 102 of the locking bar 74. Thus, the locking bar 74 can have multiple positions within the locking bar engaging grooves 104 of the rack 72, including at least one valid position where the locking bar 74 is in the unlocked position.

FIG. 13 shows an example where the locking bar 74 is positioned within the locking bar engaging groove 104 of the rack 72 while the blocking portion 98 is removed from the locking bar engaging groove 30 of the cylinder body 14, thereby positioning the locking bar in the unlocked position. FIG. 14 shows an example where the locking bar 74 can be positioned within the locking bar engaging groove 104 of the rack 72 while the blocking portion 98 of locking bar 74 remains positioned within the locking bar engaging groove 30 of the cylinder body 14, thereby maintaining a locked locking bar position. As the racks 72 move with the key followers 38, the locking bar 74 contacts the side 83 of the rack 72 outside of the locking bar engaging groove 104 and remains in the locked position. In some examples, the locking bar 74 travels over the anti-picking grooves 81 as the racks 72 move.

Figure 16:
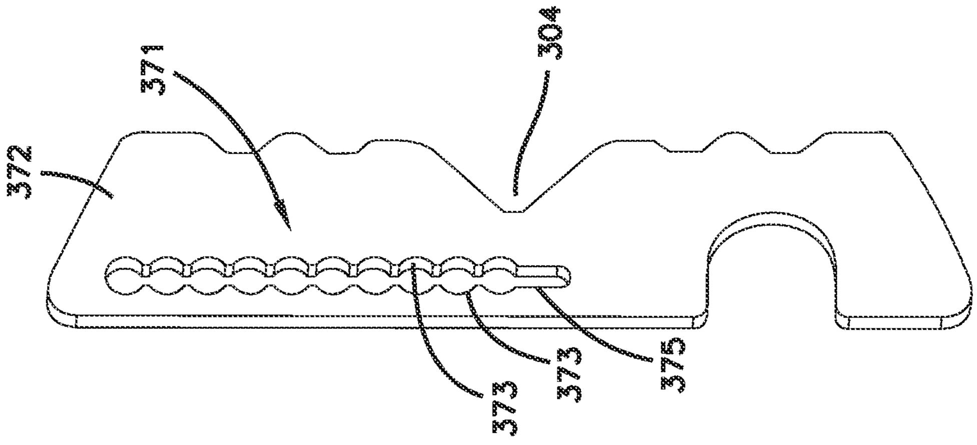
FIG. 16 is a perspective view of another example of a rack according to an embodiment of this disclosure associated with the key follower of FIG. 15.
Figure 15:
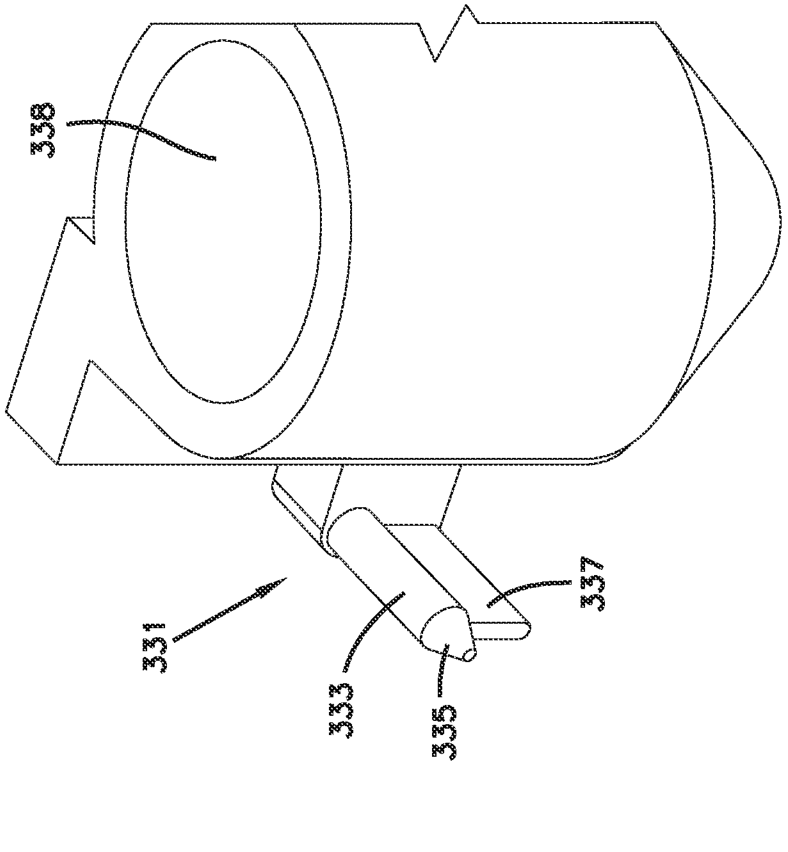
FIG. 15 is a perspective view of another example of a key follower according to an embodiment of this disclosure.

Another example of a pin-rack engagement feature according to an embodiment of the present disclosure is shown in FIGS. 15 and 16. The pin-rack engagement feature includes a post 331 of spring-loaded pins 338 engaged with a mating slot 371 of racks 372. Complementary engagement surfaces of the post 331 and the slot 371 engage with one another to block movement of the spring-loaded pins 338 relative to the racks 372. As shown in FIG. 15, each post 331 includes a barrel 333 and a stiffening rib 337. The barrel 333 defines a semi-cylindrical outer surface. In some examples, a cone 335 is arranged at the ends of the barrels 333 to guide insertion of post 331 into slot 371. As seen in FIG. 16, the mating slot 371 includes a series of semi-cylindrical grooves 373. A series of grooves 373 extends along either side of mating slot 371. A recess 375 is positioned at one end of the slot 371 to accommodate the stiffening rib 337. The semi-cylindrical surfaces of the barrel 333 and semi-cylindrical grooves 373 maximize a contact surface area of the pin-rack engagement feature. In some examples, the barrels 333 and the grooves 373 are formed to define complementary non-circular geometric profiles, such as triangular or rectangular for example. In the illustrative embodiment, the slot 371 extends through and is bounded on all sides by the rack 372 as shown in FIG. 16. In some examples, the slot 371 does not extend through the entire rack 372. The rack 372 includes a locking bar engaging groove 304.

Figure 18:
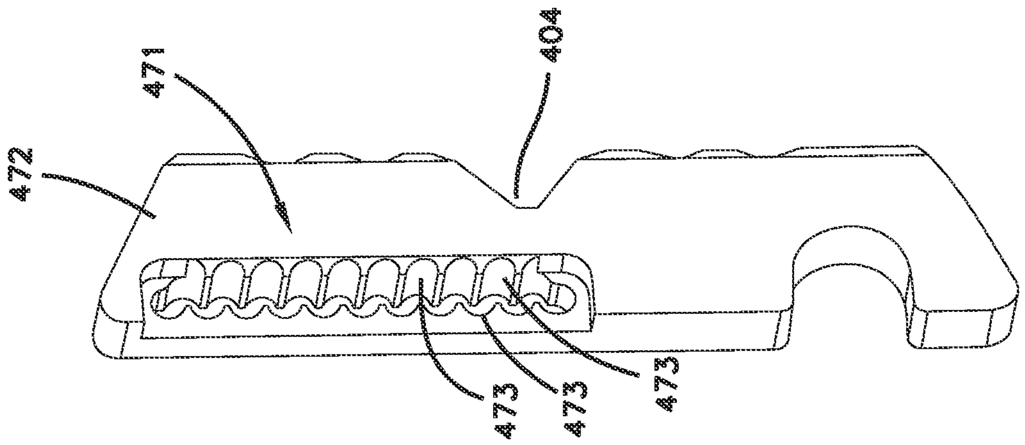
FIG. 18 is a perspective view of another example of a rack according to an embodiment of this disclosure associated with the key follower of FIG. 17.
Figure 17:
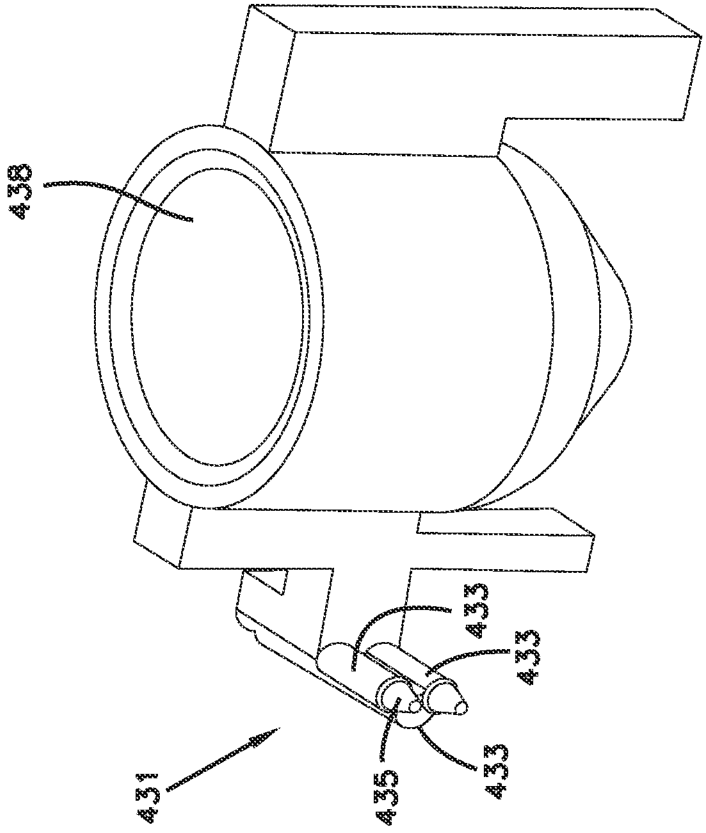
FIG. 17 is a perspective view of another example of a key follower according to an embodiment of this disclosure.

Another example of a pin-rack engagement feature according to an embodiment of the present disclosure is shown in FIGS. 17 and 18. The pin-rack engagement feature includes a post 431 of spring-loaded pins 438 engaged with a mating slot 471 of racks 472. Complementary engagement surfaces of the post 431 and the slot 471 engage with one another to block movement of the spring-loaded pins 438 relative to the racks 472. As shown in FIG. 17, each post 431 includes a pair of barrels 433. Each barrel 433 defines a semi-cylindrical outer surface. In some examples, a cone 435 is arranged at the end of each of the barrels 433 to guide insertion of posts 431 into slot 471. As seen in FIG. 18, the mating slot 471 includes a series of semi-cylindrical grooves 473. A series of grooves 473 extends along either side of mating slot 471. The semi-cylindrical surfaces of each barrel 433 and semi-cylindrical grooves 473 maximize a contact surface area of the pin-rack engagement feature. In some examples, the barrels 433 and the grooves 473 are formed to define complementary non-circular geometric profiles, such as triangular or rectangular for example. In the illustrative embodiment, the slot 471 extends through and is bounded on all sides by the rack 472 as shown in FIG. 18. In some examples, the slot 471 does not extend through the entire rack 472. The rack 472 includes a locking bar engaging groove 404.

Figure 20:
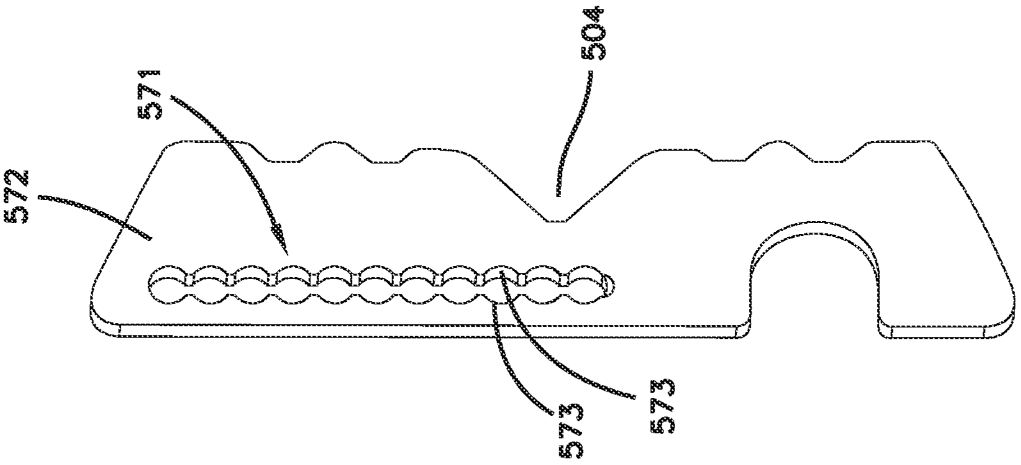
FIG. 20 is a perspective view of another example of a rack according to an embodiment of this disclosure associated with the key follower of FIG. 19.
Figure 19:
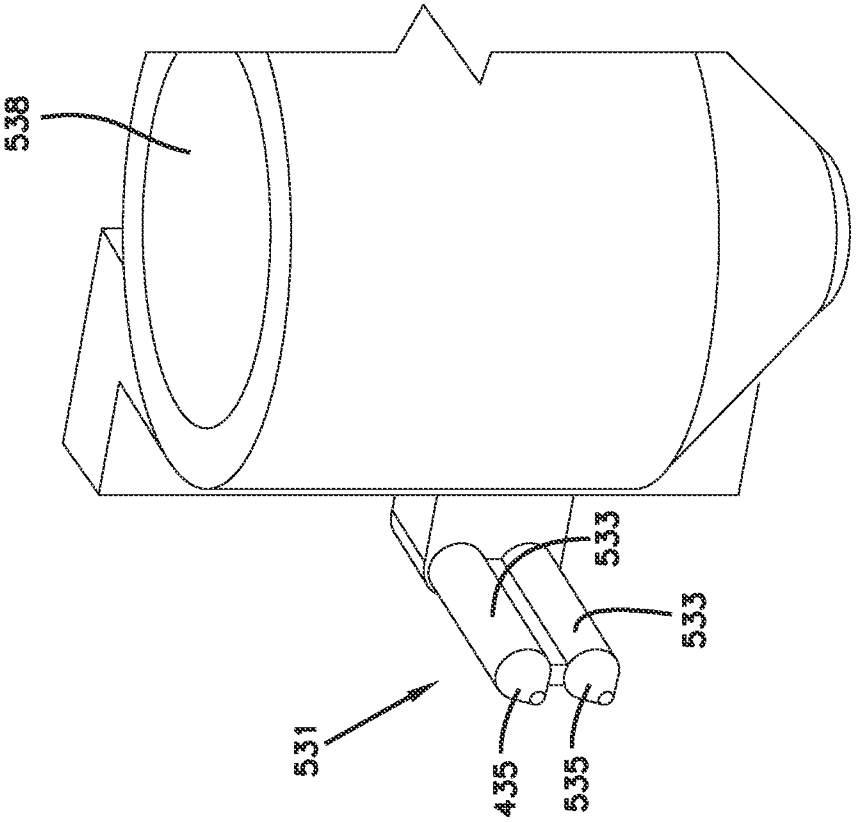
FIG. 19 is a perspective view of another example of a key follower according to an embodiment of this disclosure.

Another example of a pin-rack engagement feature according to an embodiment of the present disclosure is shown in FIGS. 19 and 20. The pin-rack engagement feature includes a post 531 of spring-loaded pins 538 engaged with a mating slot 571 of racks 572. Complementary engagement surfaces of the post 531 and the slot 571 engage with one another to block movement of the spring-loaded pins 538 relative to the racks 572. As shown in FIG. 19, each post 531 includes a pair of vertically stacked of barrels 533. Each barrel 533 defines a semi-cylindrical outer surface. In some examples, a cone 535 is arranged at the end of each of the barrels 533 to guide insertion of posts 531 into slot 571. As seen in FIG. 20, the mating slot 571 includes a series of semi-cylindrical grooves 573. A series of grooves 573 extends along either side of mating slot 571. The semi-cylindrical surfaces of each barrel 533 and semi-cylindrical grooves 573 maximize a contact surface area of the pin-rack engagement feature. In some examples, the barrels 533 and the grooves 573 are formed to define complementary non-circular geometric profiles, such as triangular or rectangular for example. In the illustrative embodiment, the slot 571 extends through and is bounded on all sides by the rack 572 as shown in FIG. 20. In some examples, the slot 571 does not extend through the entire rack 572. The slot 571 is generally positioned on an opposite side of the rack 572 from the respective locking bar engaging groove 504 of that rack.

Figure 21:
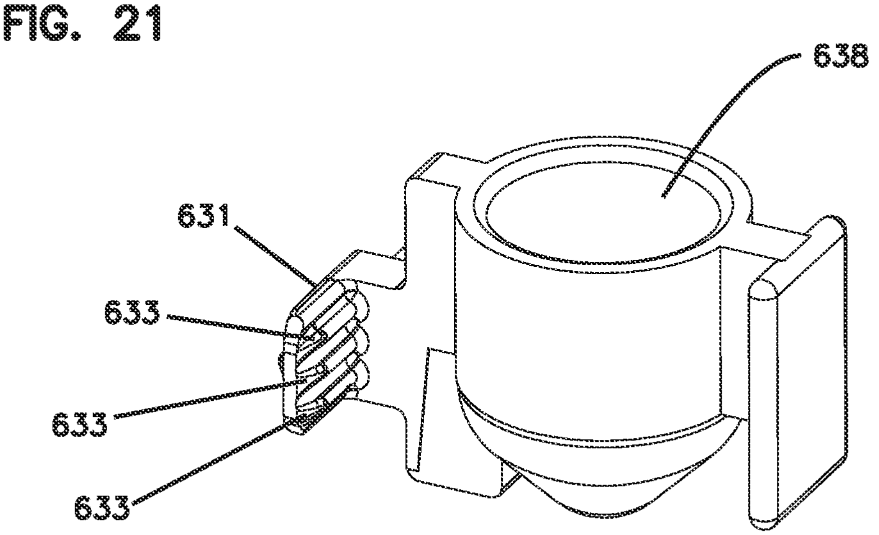
FIG. 21 is a perspective view of another example of a key follower according to an embodiment of this disclosure.
Figure 22:
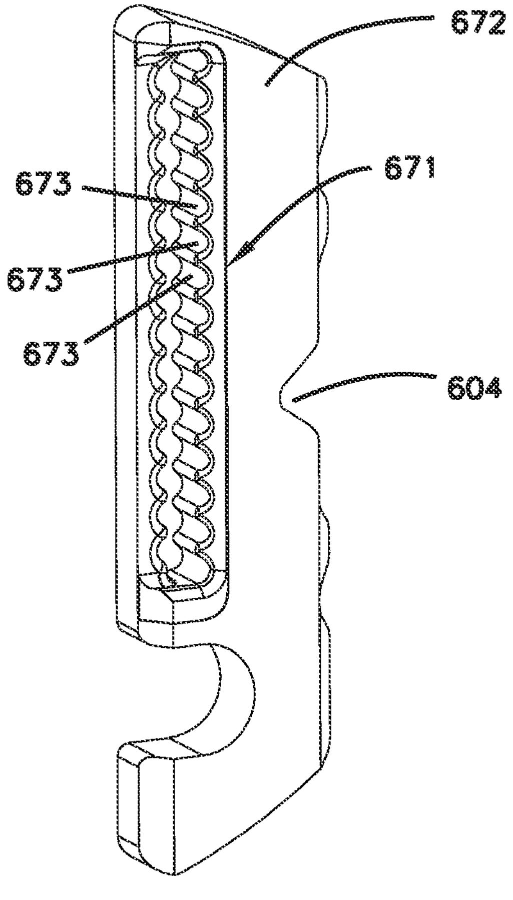
FIG. 22 is a perspective view of another example of a rack according to an embodiment of this disclosure associated with the key follower of FIG. 21.

A still further example of a pin-rack engagement feature according to an embodiment of the present disclosure is shown in FIGS. 21 and 22. The pin-rack engagement feature includes a post 631 of pins 638 engaged with a mating slot 671 of racks 672. Complementary engagement surfaces of the post 631 and the slot 671 engage with one another to block movement of the spring-loaded pins 638 relative to the racks 672.

As shown in FIG. 21, each post 631 includes set of ridges 633 configured to integrate with the slot 671. The ridges 633 may also be said to be formed from a plurality of barrels, as discussed above. As seen in FIG. 22, the mating slot 671 includes a series of semi-cylindrical grooves 673. The grooves 673 extends along either side of the mating slot 671. The ridges 633 of the post 631 and semi-cylindrical groove 673 maximize a contact surface area of the pin-rack engagement feature. In some examples, the post 631 and the grooves 673 are formed to define complementary non-circular geometric profiles, such as triangular or rectangular for example. In the illustrative embodiment, the slot 671 extends through and is bounded on all sides by the rack 672 as shown in FIG. 22. In some examples, the slot 671 does not extend through the entire rack 672.

Figure 23:
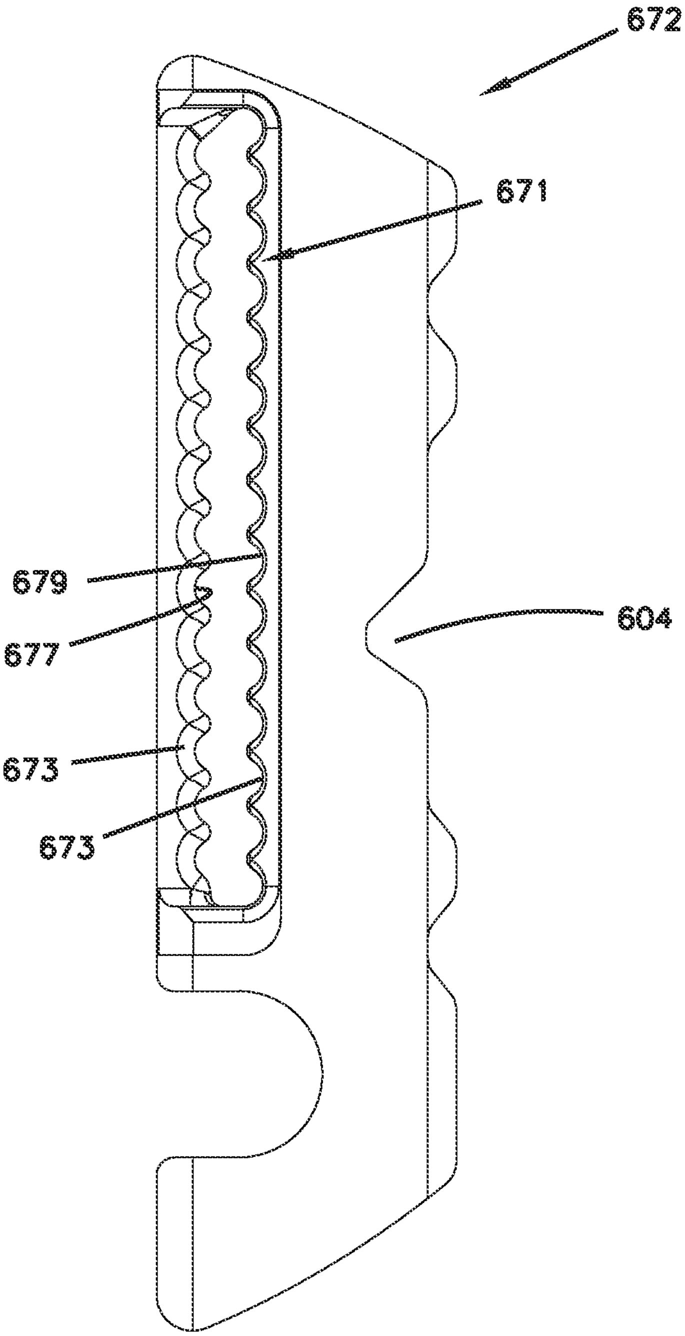
FIG. 23 is a front view of the rack of FIG. 22.
Figure 24:
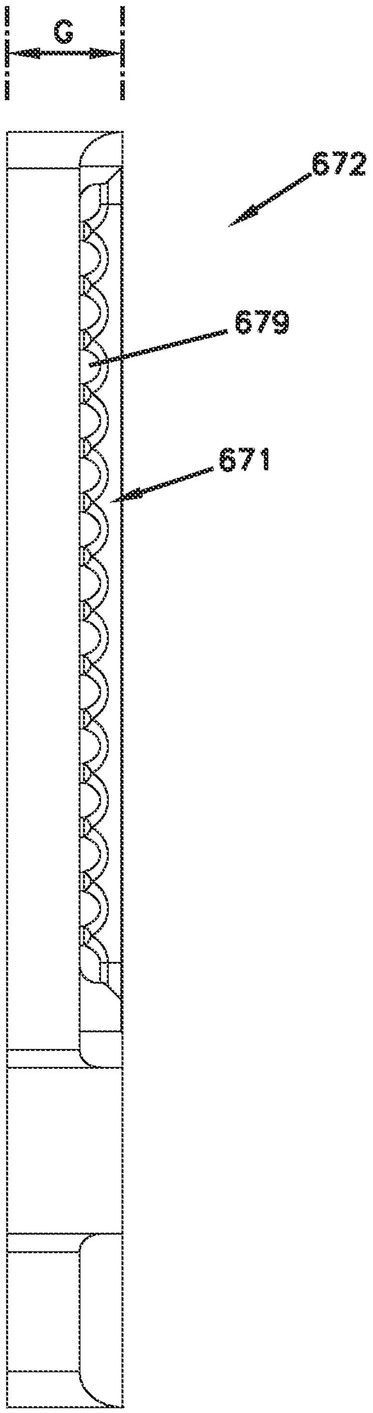
FIG. 24 is a side view of the rack of FIG. 22.

As seen in FIGS. 22-24, the slot 671 includes a series of semi-cylindrical grooves 673. The series of grooves 673 extends along either side of the slot 671 and are offset from one another to correspond to the pattern of ridges 633. The grooves 673 of each rack 672 include a first set of grooves 677, positioned closest to the key followers (e.g., pins 638), and a second set of grooves 679 opposite from the first set of grooves 677 in the slot 671. In some examples, as shown in FIG. 24, the second set of grooves 679 can have a length G that is greater than a comparable length of the first set of grooves 677. In the illustrative embodiment, the slot 671 extends through and is bounded on all sides by the rack 672, as shown in FIG. 22. In some examples, the slot 671 does not extend through the entire rack 672. The slot 671 is generally positioned on an opposite side of the rack 672 from the respective locking bar engaging groove 604 of that rack.

Figure 25:
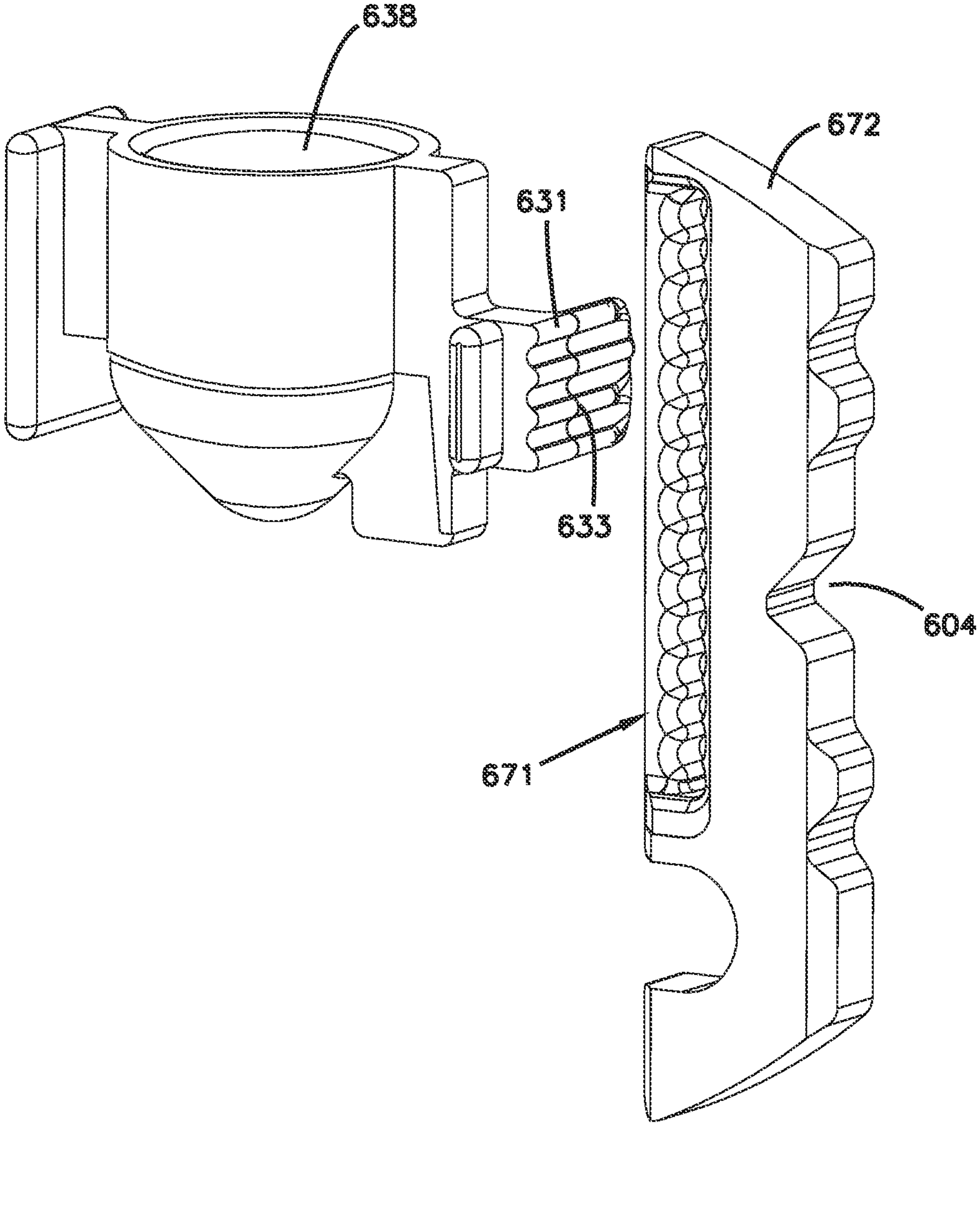
FIGS. 25-27 are perspective views of the key follower of FIG. 21 and rack of FIG. 22 mating.
Figure 26:
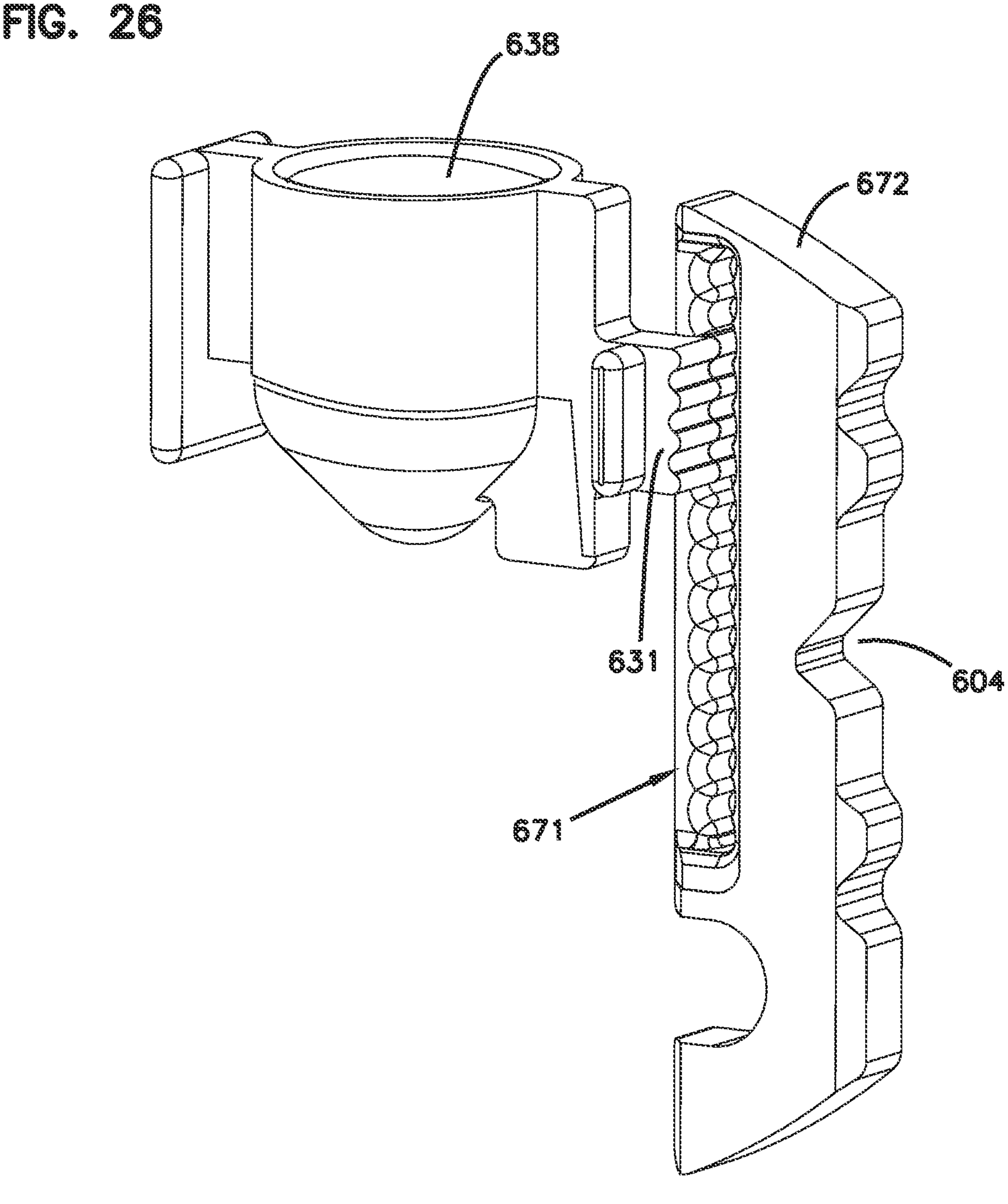
Figure 27:
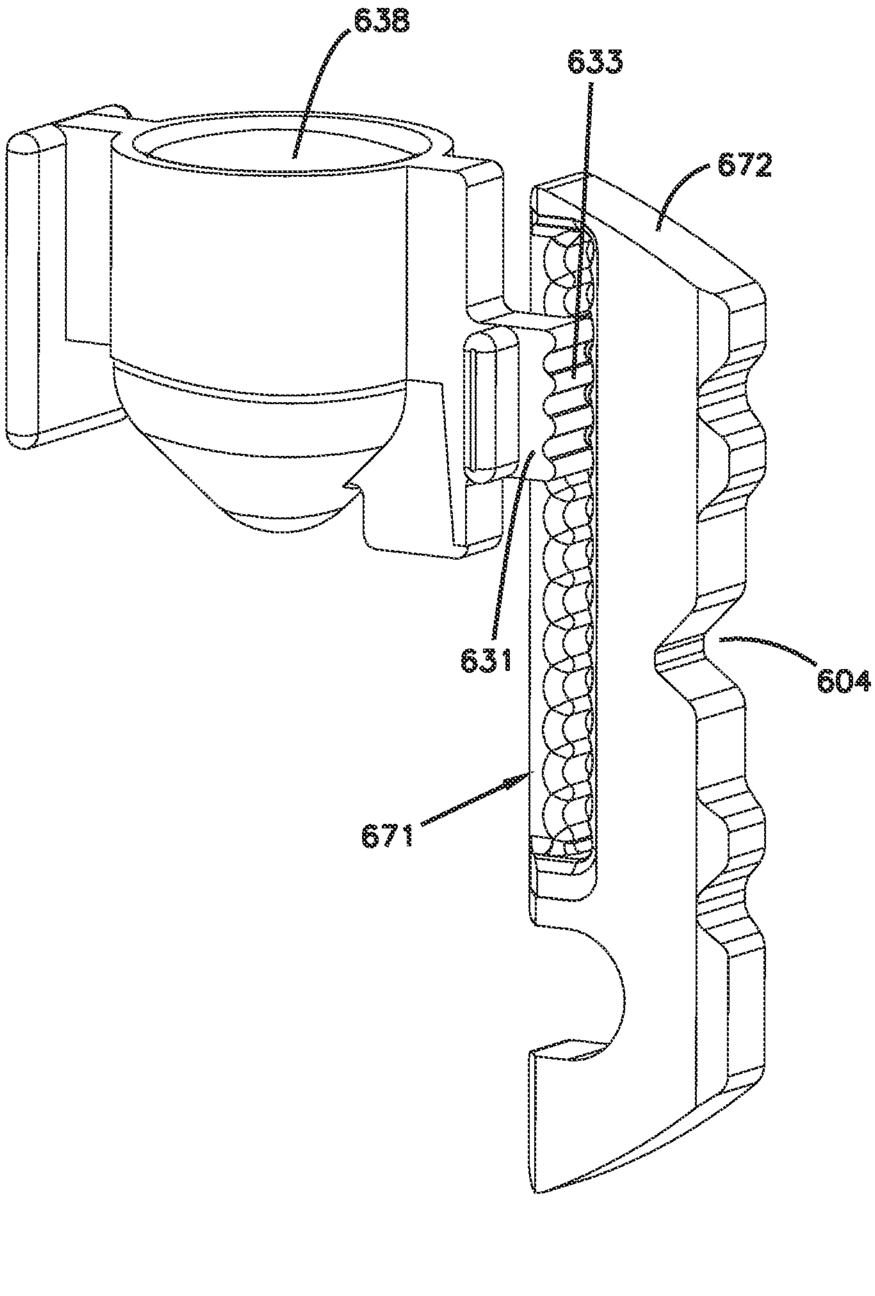
Figure 28:
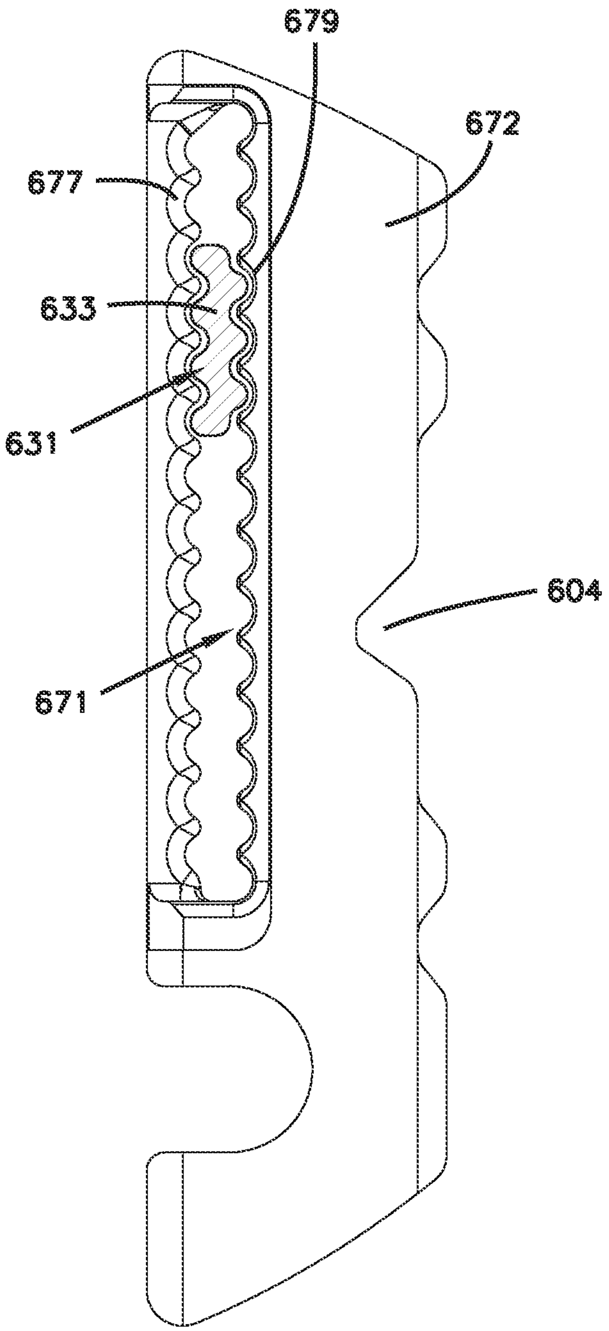
FIG. 28 is a cross-sectional view of a portion of the key follower of FIG. 21 positioned within the rack of FIG. 22.

In the example sequence shown in FIGS. 25-27 showing engagement between a pin 638 and rack 672, the semi-cylindrical surfaces of the ridges 633 and semi-cylindrical grooves 673 increase the contact surface area of the pin-rack engagement feature. In the depicted example, as shown in FIG. 27, when mated, a single ridge 633 interfaces with a single groove of the second set of grooves 79. Further, in the depicted example, when mated, the ridges 633 interface with a pair of grooves of the first set of grooves 677, as well as grooves 679.

Specifically, in the depicted example, the post 631 of each key follower 638 interfaces with both sets of grooves 677. 679 of each slot 671 of each rack 672 to further strengthen and stabilize the pin-rack engagement feature. In some examples, depending on the thickness of the rack 672 and the lengths of the posts 631, the post 631 does not extend entirely through the slot 671. The post 631 only need to interface, and interlock, with the slot 671 to ensure that the rack 672 and key followers (e.g., pins 638) move together. Such an interfacing arrangement maintains strength of the pin-rack engagement feature even as sizes of the components are reduced. It is considered within the scope of the present disclosure, that the key followers 638 can have a variety of different sizes or shapes that interface with a variety of different numbers of either the first or second set of grooves 677, 679. In particular, with respect to the embodiment shown, to accommodate the additional number of barrels 633 while maintaining a constant number of possible relative positions between the pin 638 and rack 672, a corresponding increase in a number of grooves 679 within the slot 671 are provided relative to the number of grooves 573 within the slot 571 seen in FIG. 20. As compared to the embodiments discussed previously, the increased pin size increases a strength of the post 631, particularly in the vertical direction. This improves the overall strength of the lock cylinder, in avoiding damage in response to objects being inserted into a keyway opening, such as keyway opening 44.

The features of one spring-loaded pin 38, 338, 438, 538 or rack 72, 372, 472, 572 can be used in any other spring-loaded pin 38, 338, 438, 538 or rack 72, 372, 472, 572. Spring-loaded pins 38, 338, 438, 538 can include more or less posts 31, 331, 431, 531 and racks 72, 372, 472, 572 can include more or less grooves 73, 373, 473, 573.

EXAMPLES

Illustrative examples of the lock cylinder disclosed herein are provided below. An embodiment of the lock cylinder may include any one or more, and any combination of, the examples described below.

Example 1 is a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly, with the rack being selectively disengageable from the key follower to facilitate rekeying between different keys. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is formed to define a post and the rack is formed to include a slot extending at least partially through and bounded by the rack. The post is received in the slot such that complementary engagement surfaces of the post and slot engage with one another to block movement of the key follower relative to the rack.

In Example 2, the subject matter of Example 1 is further configured such that the post is formed to define at least a semi-cylindrical outer surface and the slot includes a series of semi-cylindrical grooves. The semi-cylindrical outer surface of the post engages with at least one of the semi-cylindrical grooves of the slot when the post is received in the slot.

In Example 3, the subject matter of Example 2 is further configured such that the post includes a barrel defining the at least one semi-cylindrical surface.

In Example 4, the subject matter of Example 3 is further configured such that the slot further includes a recess for receiving the at least one semi-cylindrical surface.

In Example 5, the subject matter of Example 2 is further configured such that the post includes two barrels defining the at least one semi-cylindrical surface.

In Example 6, the subject matter of Example 5 is further configured such that the barrels are offset from one another in a linear pattern.

In Example 7, the subject matter of Example 2 is further configured such that the post includes three barrels defining the at least one semi-cylindrical surface.

In Example 8, the subject matter of Example 7 is further configured such that the barrels are offset from one another in a triangular pattern.

In Example 9, the subject matter of Example 8 is further configured such that a first series of semi-cylindrical grooves are arranged along a first side of the slot and a second series of semi-cylindrical grooves are arranged along a second side of the slot. The first series of semi-cylindrical grooves is offset from the second series of semi-cylindrical grooves.

Example 10 is a rekeyable lock cylinder with a cylinder body and a plug assembly disposed in the cylinder body. The cylinder body has a longitudinal axis and is formed to define a groove. The plug assembly is rotatable about the longitudinal axis. A key follower and a corresponding rack are disposed in the plug assembly. A locking bar is movable between a locked position engaged with the groove of the cylinder body for blocking rotation of the plug assembly with respect to the cylinder body and an unlocked position spaced apart from the groove of the cylinder body to allow rotation of the plug assembly with respect to the cylinder body. The rack controls movement of the locking bar between the locked and unlocked positions. The key follower is engaged with the rack by an engagement feature. The rack is selectively disengageable from the key follower to facilitate rekeying between different keys. The engagement feature allows at least seven different positions of the key follower relative to the rack to allow at least seven different bitting positions in the rekeyable lock cylinder.

In Example 11, the subject matter of Example 10 is further configured such that the engagement feature includes a post and a slot, the post being formed to define at least a semi-cylindrical outer surface. The slot includes a series of semi-cylindrical grooves, and the semi-cylindrical outer surface of the post engages with at least one of the semi-cylindrical grooves of the slot when the post is received in the slot.

In Example 12, the subject matter of Example 10 is further configured such that the post includes two barrels defining the at least semi-cylindrical surface.

In Example 13, the subject matter of Example 12 is further configured such that the barrels are offset from one another in a linear pattern.

In Example 14, the subject matter of Example 11 is further configured such that a first series of semi-cylindrical grooves is arranged along a first side of the slot and a second series of semi-cylindrical grooves is arranged along a second side of the slot, and wherein the first series of semi-cylindrical grooves is offset from the second series of semi-cylindrical grooves.

Example 15 is a rekeyable lock cylinder. The rekeyable lock cylinder includes a cylinder body with a longitudinal axis and is formed to define a groove. The rekeyable lock cylinder includes a plug assembly disposed in the cylinder body and rotatable about the longitudinal axis. The rekeyable lock cylinder includes a locking bar movable between a locked position and an unlocked position. When in the locked position, the locking bar is positioned within the groove of the cylinder body to block rotation of the plug assembly with respect to the cylinder body. When in the unlocked position, the locking bar is spaced apart from the groove of the cylinder body to allow rotation of the plug assembly with respect to the cylinder body. The rekeyable lock cylinder includes a key follower disposed in the plug assembly and the key follower includes a rack engagement feature. The rekeyable lock cylinder includes a rack disposed in the plug assembly and the rack includes a key follower engagement feature. The rack engagement feature of the key follower and the key follower engagement feature of the rack are engaged to facilitate simultaneous movement of the key follower and the rack. The rack controls movement of the locking bar between the locked and unlocked positions. At least one of the rack engagement feature of the key follower and the key follower engagement feature of the rack is a projection and at least one of the rack engagement feature of key follower and the key follower engagement feature of the rack is a slot. The rack is selectively disengageable from the key follower when moving in a direction parallel to the longitudinal axis of the plug assembly.

In Example 16, the subject matter of Example 15 is further configured such that the rack engagement feature of the key follower and the key follower engagement feature of the rack allow at least seven different positions of the key follower relative to the rack.

In Example 17, the subject matter of Example 15 is further configured such that the projection is formed to define at least a semi-cylindrical outer surface. The slot includes a series of semi-cylindrical grooves, and the semi-cylindrical outer surface of the post engages with at least one of the semi-cylindrical grooves of the slot when the post is received in the slot.

In Example 18, the subject matter of Example 17 is further configured such that the projection includes two barrels defining the at least semi-cylindrical surface.

In Example 19, the subject matter of Example 18 is further configured such that the barrels are offset from one another in a linear pattern.

In Example 20, the subject matter of Example 15 is further configured such that a first series of semi-cylindrical grooves is arranged along a first side of the slot of the at least one of the rack engagement feature of the key follower and the key follower engagement feature of the rack, and a second series of semi-cylindrical grooves is arranged along a second side of the slot. The first series of semi-cylindrical grooves is offset from the second series of semi-cylindrical grooves.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:

a cylinder body having a longitudinal axis and defining a groove;

a plug assembly disposed in the cylinder body and being selectively rotatable about the longitudinal axis;

a key follower and a corresponding rack disposed in the plug assembly, wherein the rack is selectively moveable in a longitudinal direction, parallel with the longitudinal axis of the cylinder body to disengage from the key follower to facilitate rekeying between different keys; and a locking bar movable between a locked position and an unlocked position with respect to the cylinder body, wherein in the locked position, the locking bar is engaged with the groove of the cylinder body for blocking rotation of the plug assembly with respect to the cylinder body, and when in the unlocked position, the locking bar is spaced apart from the groove of the cylinder body to allow rotation of the plug assembly with respect to the cylinder body, wherein the rack controls movement of the locking bar between the locked and unlocked positions, the key follower is formed to define a post having a length projecting from a body of the key follower in the longitudinal direction, the rack is formed to include a slot extending through and bounded on all sides by the rack, the slot including a plurality of key follower engagement features defined relative to the longitudinal direction, and the post is received in one or more of the plurality of key follower engagement features of the slot in the longitudinal direction such that complementary engagement surfaces of the post and the slot engage with one another to block movement of the key follower relative to the rack.

2. The rekeyable lock cylinder of claim 1, wherein the post is formed to define at least one semi-cylindrical outer surface, wherein the plurality of key follower engagement features of the slot includes a series of semi-cylindrical grooves, and wherein the at least one semi-cylindrical outer surface of the post engages with at least one of the series of semi-cylindrical grooves of the slot when the post is received in the slot.

3. The rekeyable lock cylinder of claim 2, wherein the post includes a barrel defining the at least one semi-cylindrical outer surface.

4. The rekeyable lock cylinder of claim 3, wherein the slot further includes a recess for receiving the at least one semi-cylindrical outer surface.

5. The rekeyable lock cylinder of claim 2, wherein the post includes two barrels defining the at least one semi-cylindrical outer surface.

6. The rekeyable lock cylinder of claim 5, wherein the two barrels are offset from one another in a linear pattern.

7. The rekeyable lock cylinder of claim 2, wherein the post includes three barrels defining the at least one semi-cylindrical outer surface.

8. The rekeyable lock cylinder of claim 7, wherein the three barrels are offset from one another in a triangular pattern.

9. The rekeyable lock cylinder of claim 8, wherein a first series of semi-cylindrical grooves is arranged along a first side of the slot and a second series of semi-cylindrical grooves is arranged along a second side of the slot, and wherein the first series of semi-cylindrical grooves is offset from the second series of semi-cylindrical grooves.

10. A rekeyable lock cylinder comprising:

a cylinder body having a longitudinal axis and defining a groove;

a plug assembly disposed in the cylinder body and being selectively rotatable about the longitudinal axis;

a key follower and a corresponding rack disposed in the plug assembly; and a locking bar movable between a locked position and an unlocked position with respect to the cylinder body, wherein when in the locked position, the locking bar is engaged with the groove of the cylinder body for blocking rotation of the plug assembly with respect to the cylinder body, and when in the unlocked position, the locking bar is spaced apart from the groove of the cylinder body to allow rotation of the plug assembly with respect to the cylinder body, wherein the rack controls movement of the locking bar between the locked and unlocked positions, wherein the key follower is engaged with the rack by an engagement feature, the rack is selectively moveable in a longitudinal direction, parallel with the longitudinal axis of the cylinder body to disengage from the key follower to facilitate rekeying between different keys, and the engagement feature allows at least seven different positions of the key follower relative to the rack to allow at least seven different bitting positions in the rekeyable lock cylinder, and wherein the engagement feature includes a slot formed by the rack and a post defined by the key follower, the slot extending through and bounded on all slides by the rack, the slot including a plurality of key follower engagement features defined relative to the longitudinal direction, the post having a length projecting from a body of the key follower in the longitudinal direction such that longitudinal movement engages the post at least partially within one or more of the plurality of key follower engagement features.

11. The rekeyable lock cylinder of claim 10, wherein the post is formed to define at least one semi-cylindrical outer surface, wherein the plurality of key follower engagement features of the slot includes a series of semi-cylindrical grooves, and wherein the at least one semi-cylindrical outer surface of the post engages with at least one of the series of semi-cylindrical grooves of the slot when the post is received in the slot.

12. The rekeyable lock cylinder of claim 11, wherein the post includes two barrels defining the at least one semi-cylindrical outer surface.

13. The rekeyable lock cylinder of claim 12, wherein the two barrels are offset from one another in a linear pattern.

14. The rekeyable lock cylinder of claim 11, wherein a first series of semi-cylindrical grooves is arranged along a first side of the slot and a second series of semi-cylindrical grooves is arranged along a second side of the slot, and wherein the first series of semi-cylindrical grooves is offset from the second series of semi-cylindrical grooves.

15. A rekeyable lock cylinder comprising:

a cylinder body having a longitudinal axis and defining a groove;

a plug assembly disposed in the cylinder body and being selectively rotatable about the longitudinal axis;

a locking bar movable between a locked position and an unlocked position, wherein, when in the locked position, the locking bar is positioned within the groove of the cylinder body to block rotation of the plug assembly with respect to the cylinder body, and wherein, when in the unlocked position, the locking bar is spaced apart from the groove of the cylinder body to allow rotation of the plug assembly with respect to the cylinder body;

a key follower disposed in the plug assembly, the key follower including a rack engagement feature; and a rack disposed in the plug assembly, the rack including a key follower engagement feature, wherein the rack engagement feature of the key follower and the key follower engagement feature of the rack are engaged to facilitate simultaneous movement of the key follower and the rack, and wherein the rack controls movement of the locking bar between the locked and unlocked positions;

wherein at least one of the rack engagement feature of the key follower and the key follower engagement feature of the rack is a projection and at least one of the rack engagement feature of key follower and the key follower engagement feature of the rack is a slot extending through and bounded thereby, wherein the rack is selectively disengageable from the key follower when moving in a direction parallel to the longitudinal axis of the plug assembly, and wherein the projection has a length that extends along the direction parallel to the longitudinal axis and the slot includes a plurality of engagement features defined relative to the direction parallel to the longitudinal axis, and longitudinal movement between the projection and the slot engages the projection at least partially within one or more of the plurality of engagement features.

16. The rekeyable lock cylinder of claim 15, wherein the rack engagement feature of the key follower and the key follower engagement feature of the rack allow at least seven different positions of the key follower relative to the rack.

17. The rekeyable lock cylinder of claim 15, wherein the projection is formed to define at least one semi-cylindrical outer surface, wherein the plurality of engagement features of the slot includes a series of semi-cylindrical grooves, and wherein the at least one semi-cylindrical outer surface of the projection engages with at least one of the series of semi-cylindrical grooves of the slot when the projection is received in the slot.

18. The rekeyable lock cylinder of claim 17, wherein the projection includes two barrels defining the at least one semi-cylindrical outer surface.

19. The rekeyable lock cylinder of claim 18, wherein the two barrels are offset from one another in a linear pattern.

20. The rekeyable lock cylinder of claim 17, wherein a first series of semi-cylindrical grooves is arranged along a first side of the slot, and a second series of semi-cylindrical grooves is arranged along a second side of the slot, and wherein the first series of semi-cylindrical grooves is offset from the second series of semi-cylindrical grooves.

* * * * *